March 28, 1961 G. A. MATTHEWS 2,977,439
AUTOMATIC RECLOSER
Original Filed Aug. 31, 1949 18 Sheets-Sheet 1
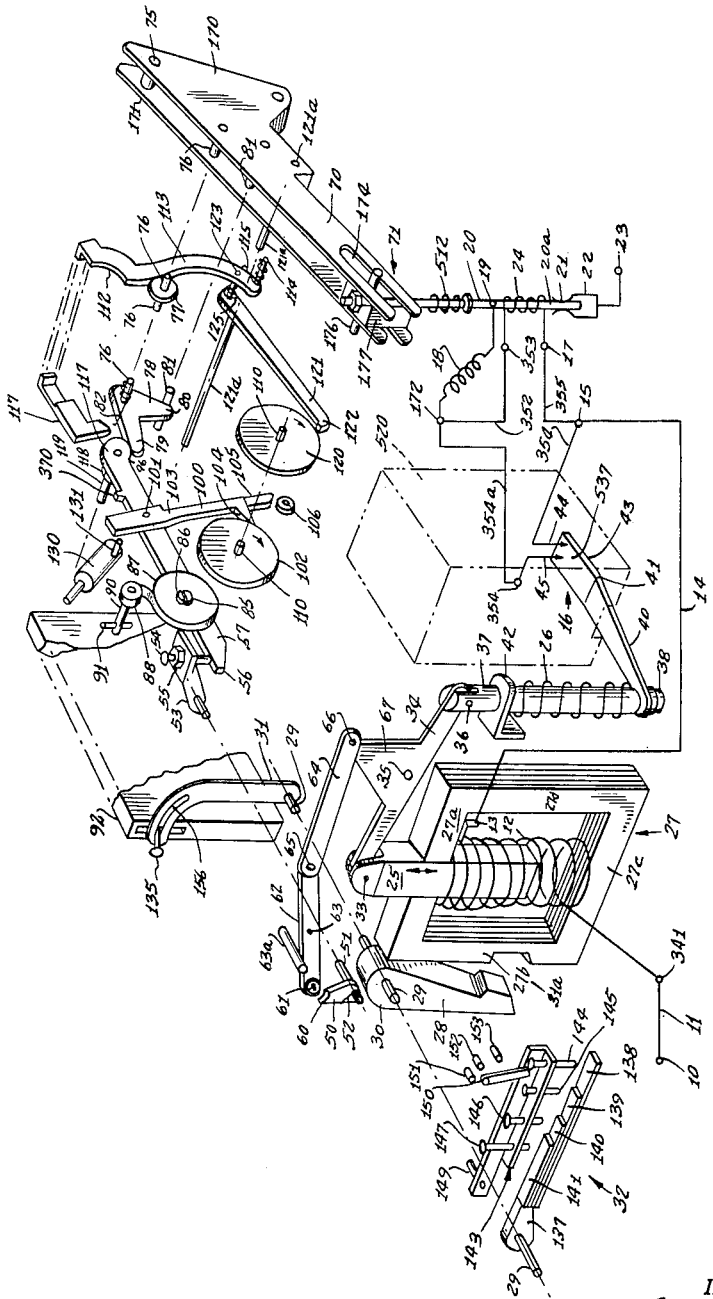
INVENTOR.
GEORGE A. MATTHEWS
BY Ostrolenk, Faber
Gerb & Soffen
ATTORNEYS

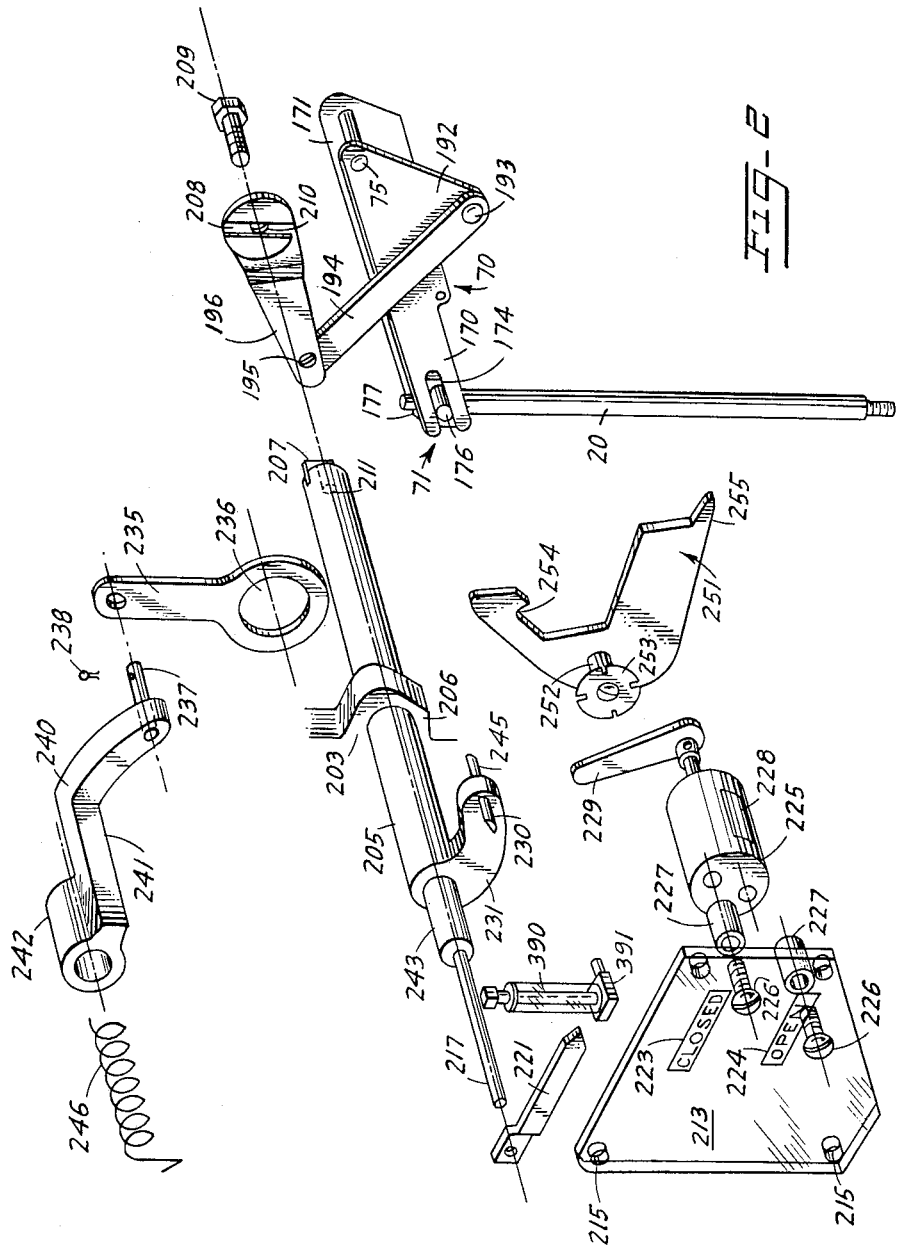

March 28, 1961
G. A. MATTHEWS
2,977,439
AUTOMATIC RECLOSER
Original Filed Aug. 31, 1949
18 Sheets-Sheet 3
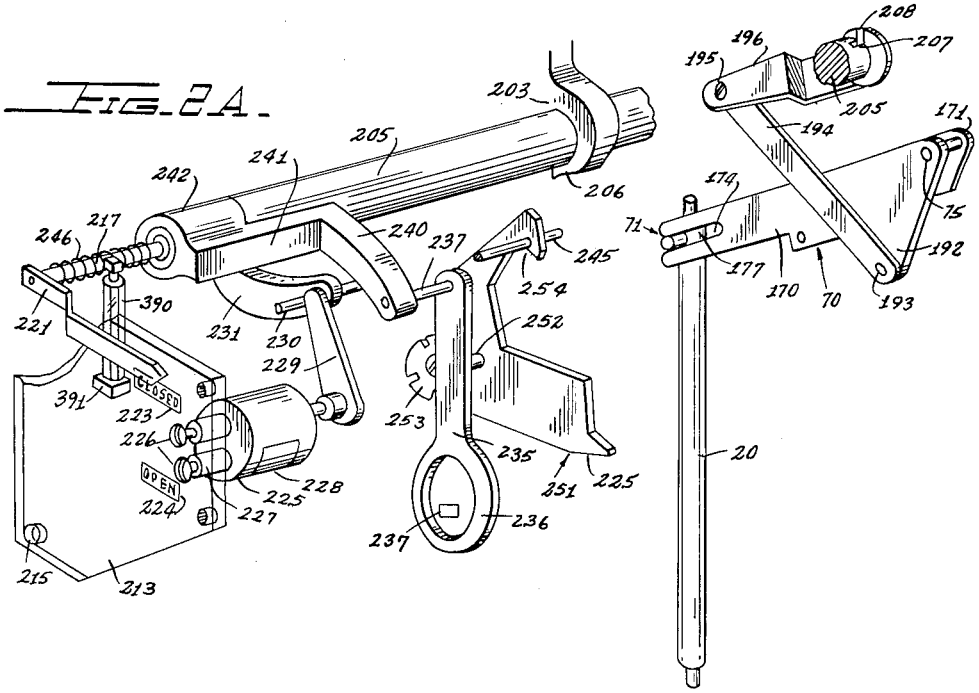
INVENTOR.
GEORGE A. MATTHEWS
BY
ATTORNEYS March 28, 1961 G. A. MATTHEWS 2,977,439
AUTOMATIC RECLOSER
Original Filed Aug. 31, 1949 18 Sheets-Sheet 4

INVENTOR.
GEORGE A. MATTHEWS

March 28, 1961
G. A. MATTHEWS
2,977,439
AUTOMATIC RECLOSER
Original Filed Aug. 31, 1949
18 Sheets-Sheet 5
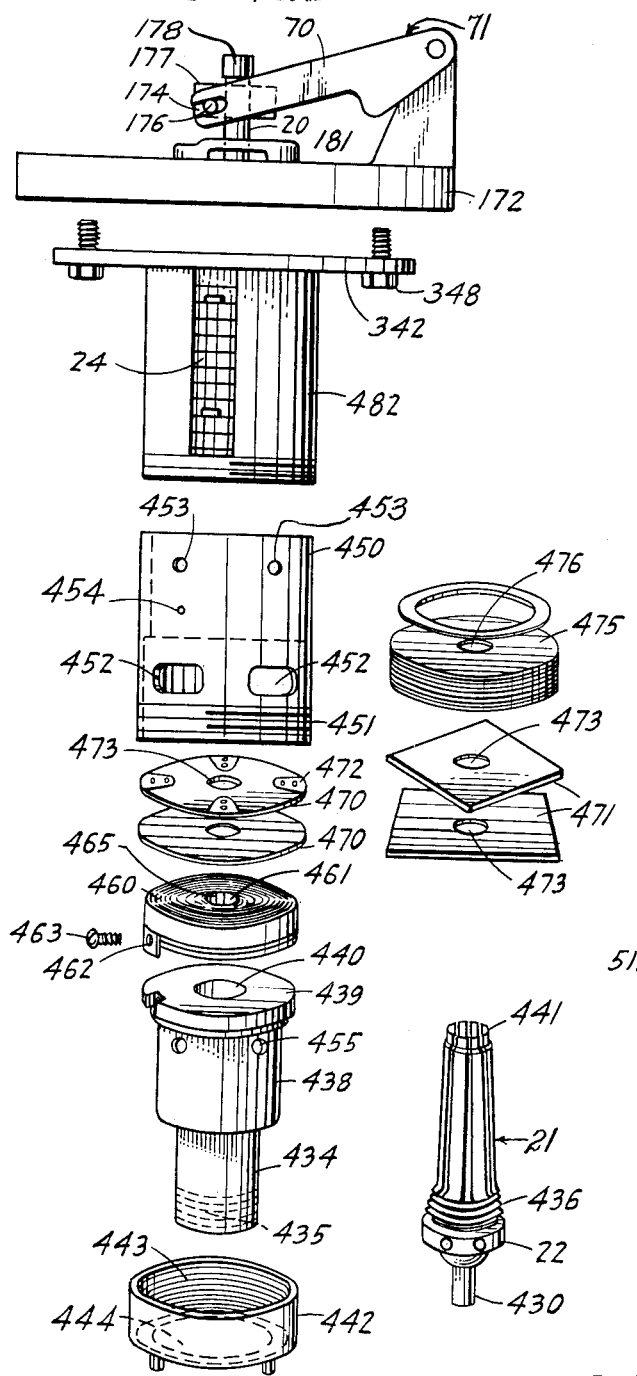
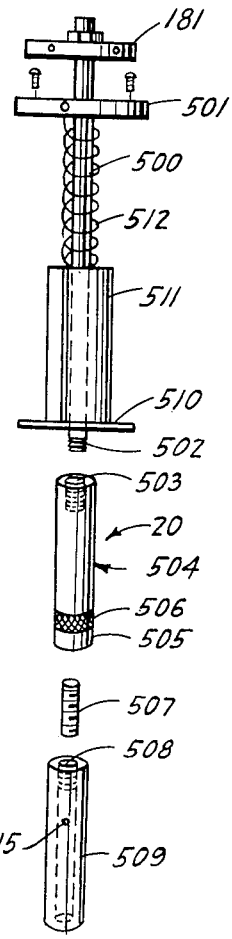
FIG-6
INVENTOR.
GEORGE A. MATTHEWS
ATTORNEYS March 28, 1961   G. A. MATTHEWS   2,977,439
AUTOMATIC RECLOSER
Original Filed Aug. 31, 1949   18 Sheets-Sheet 6
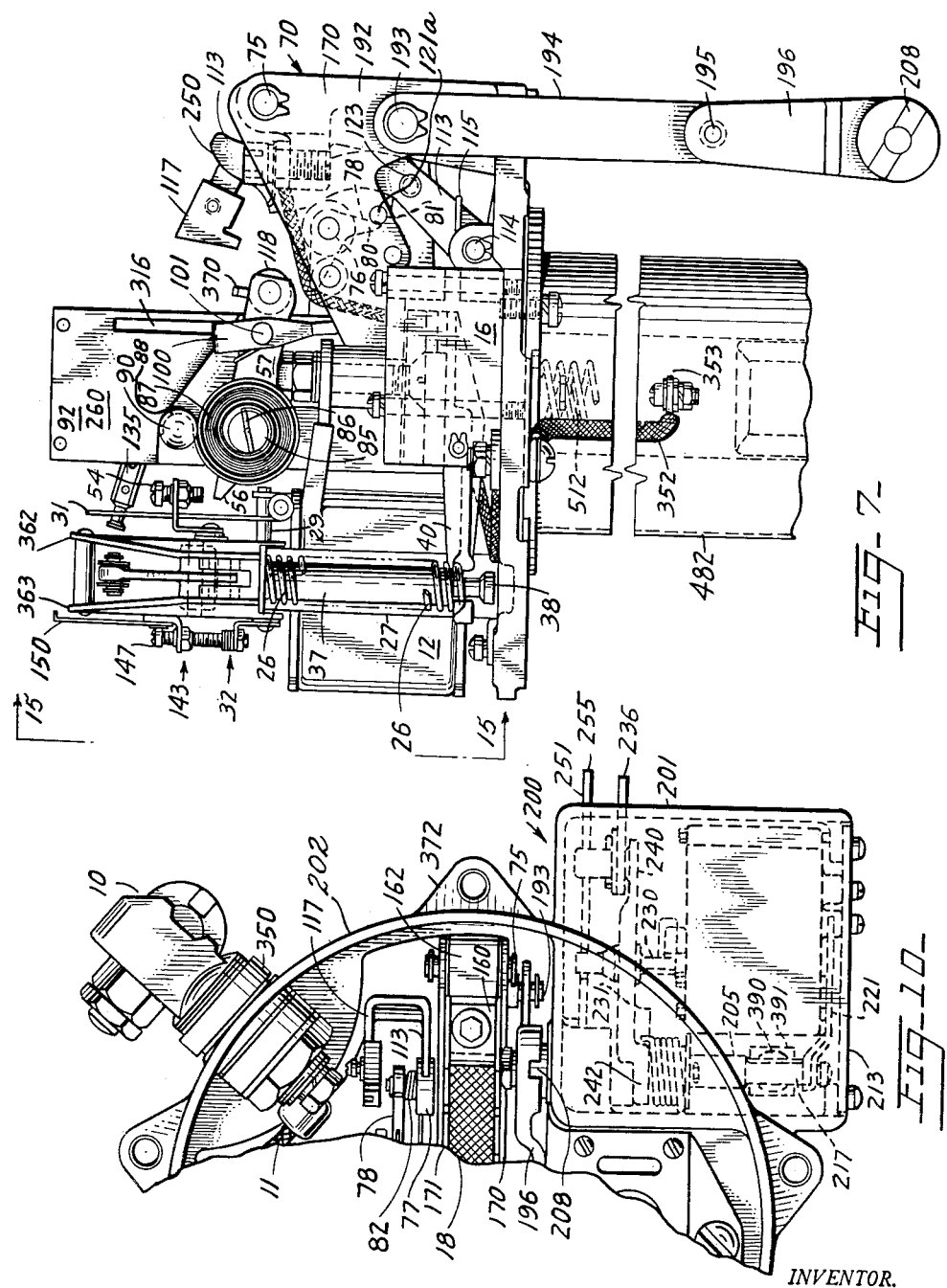
INVENTOR.
GEORGE A. MATTHEWS
BY
ATTORNEYS

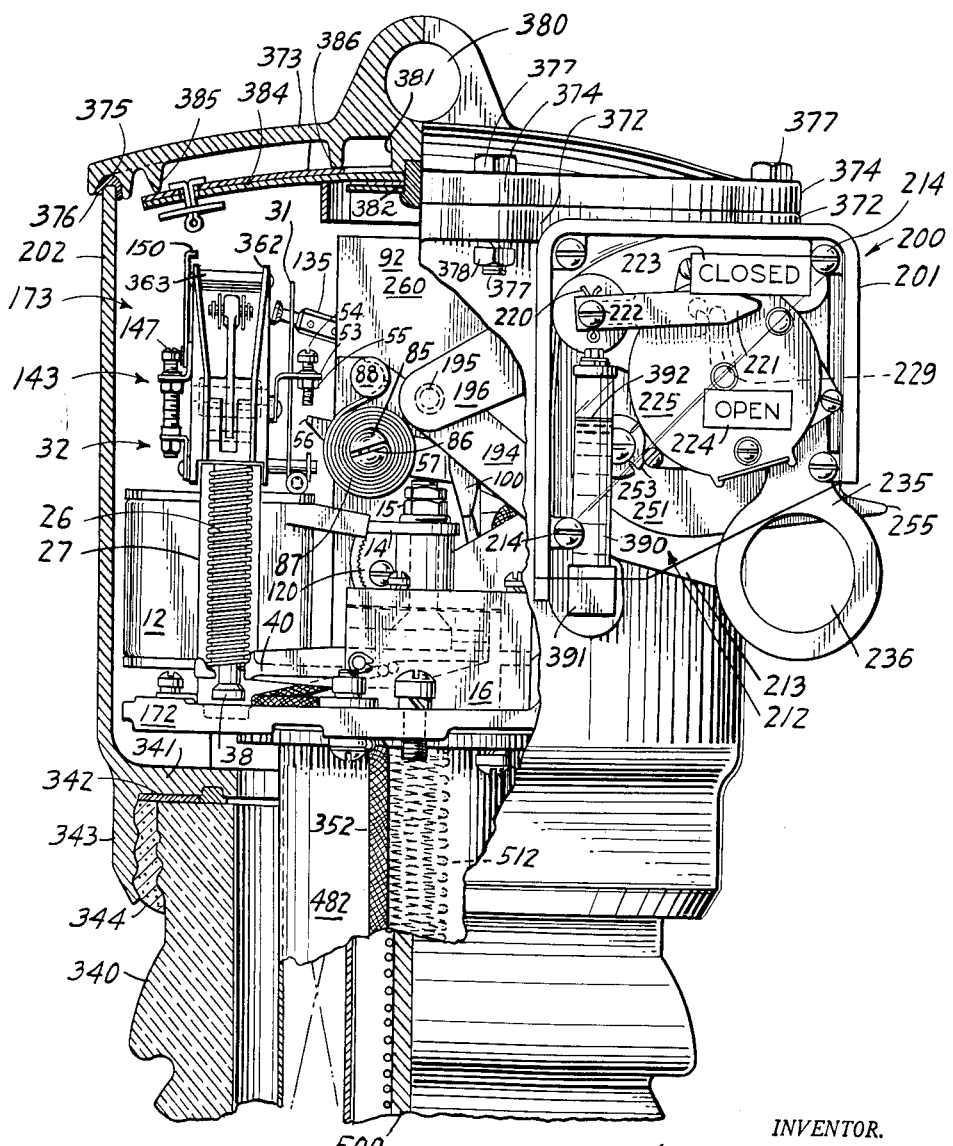

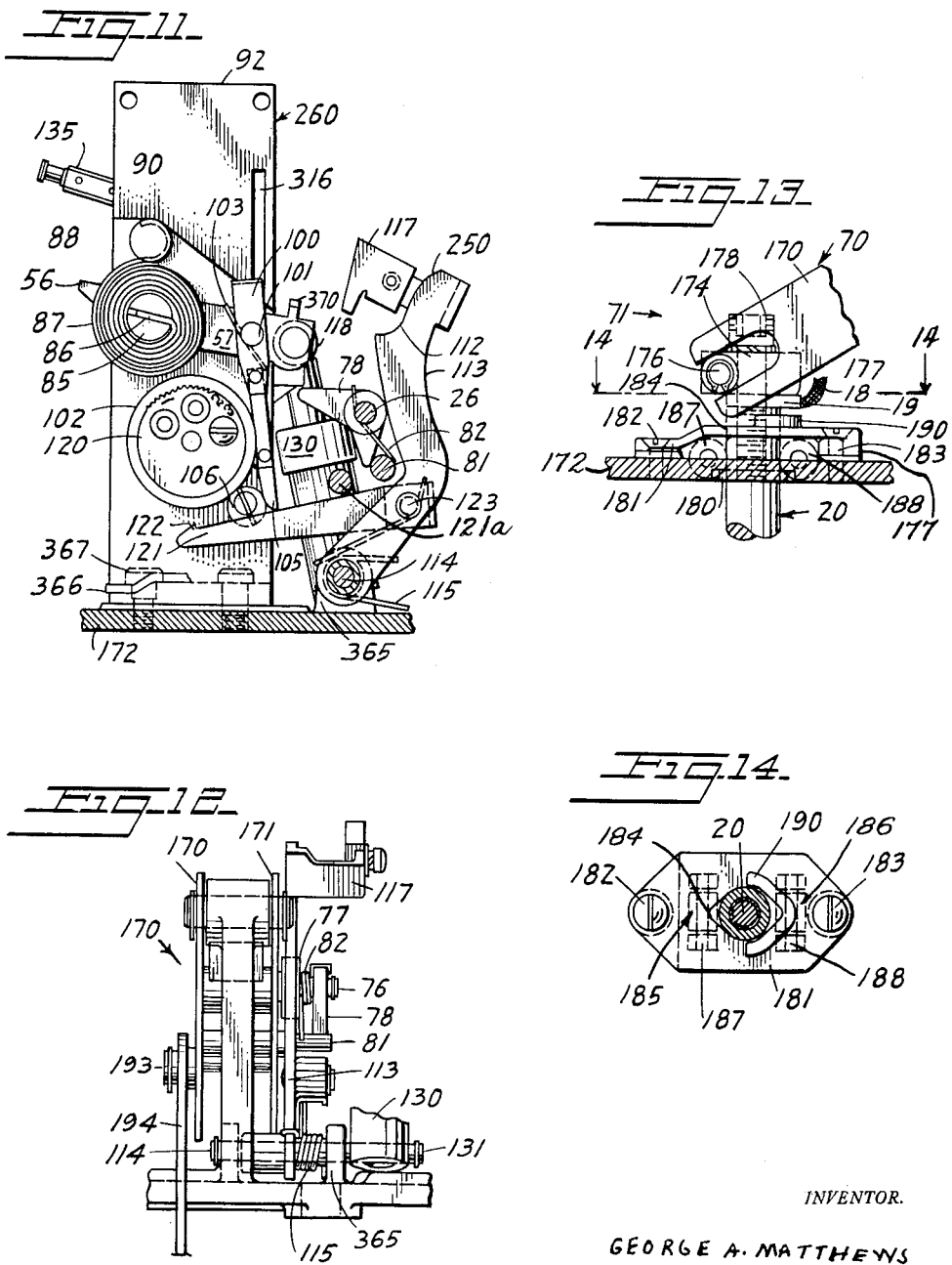

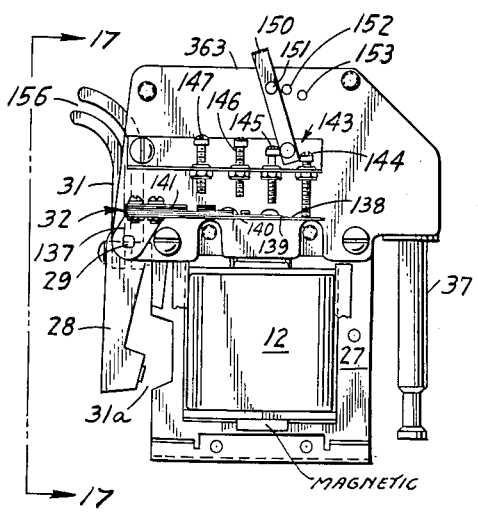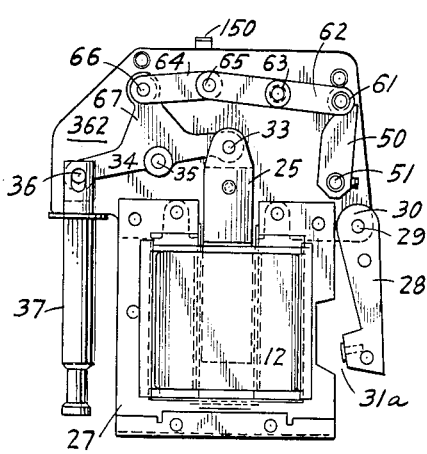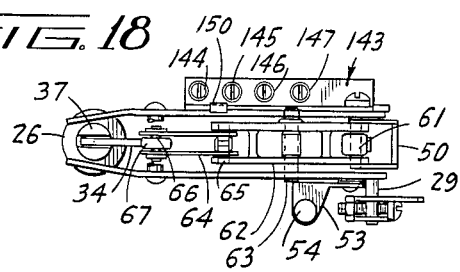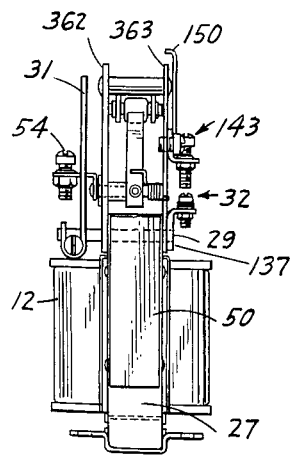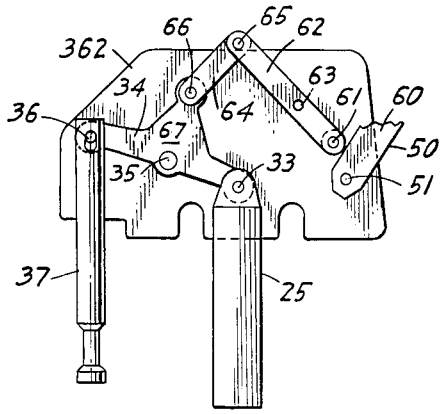

March 28, 1961
G. A. MATTHEWS
2,977,439
AUTOMATIC RECLOSER
Original Filed Aug. 31, 1949
18 Sheets-Sheet 12
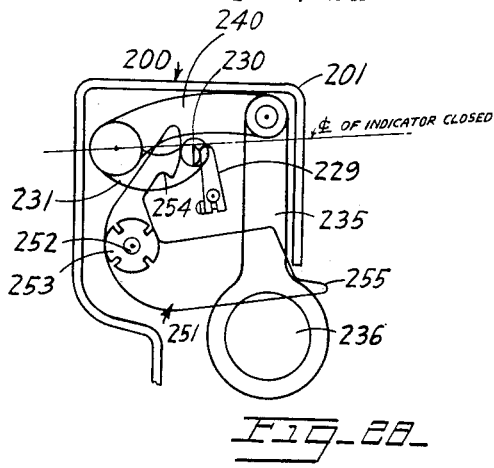
Fig-28-
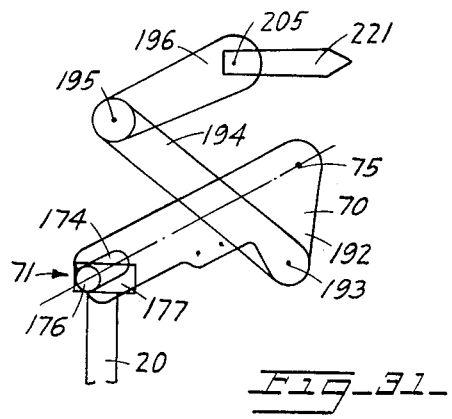
Fig-31-
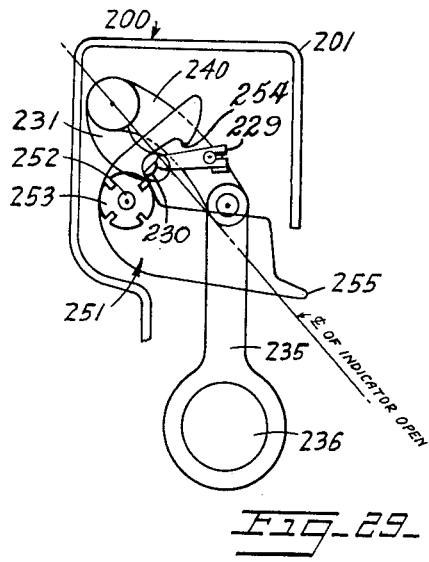
Fig-29-
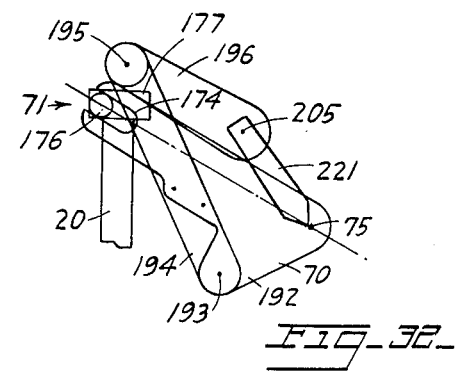
Fig-32-
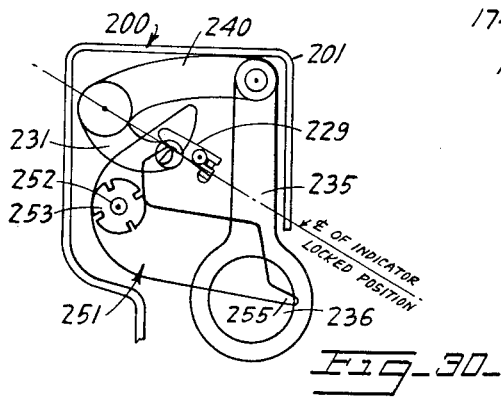
Fig-30-
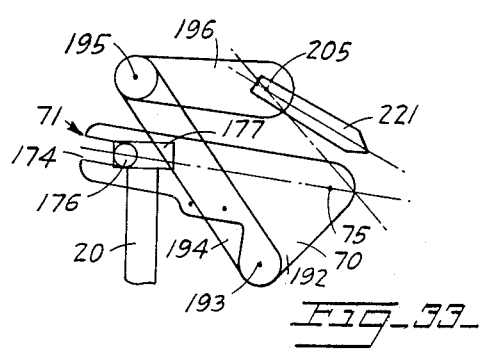
Fig-33-
INVENTOR.
GEORGE A. MATTHEWS
BY Ostrolenk, Faber,
Gerb & Soffen
ATTORNEYS March 28, 1961 G. A. MATTHEWS 2,977,439
AUTOMATIC RECLOSER
Original Filed Aug. 31, 1949 18 Sheets-Sheet 13
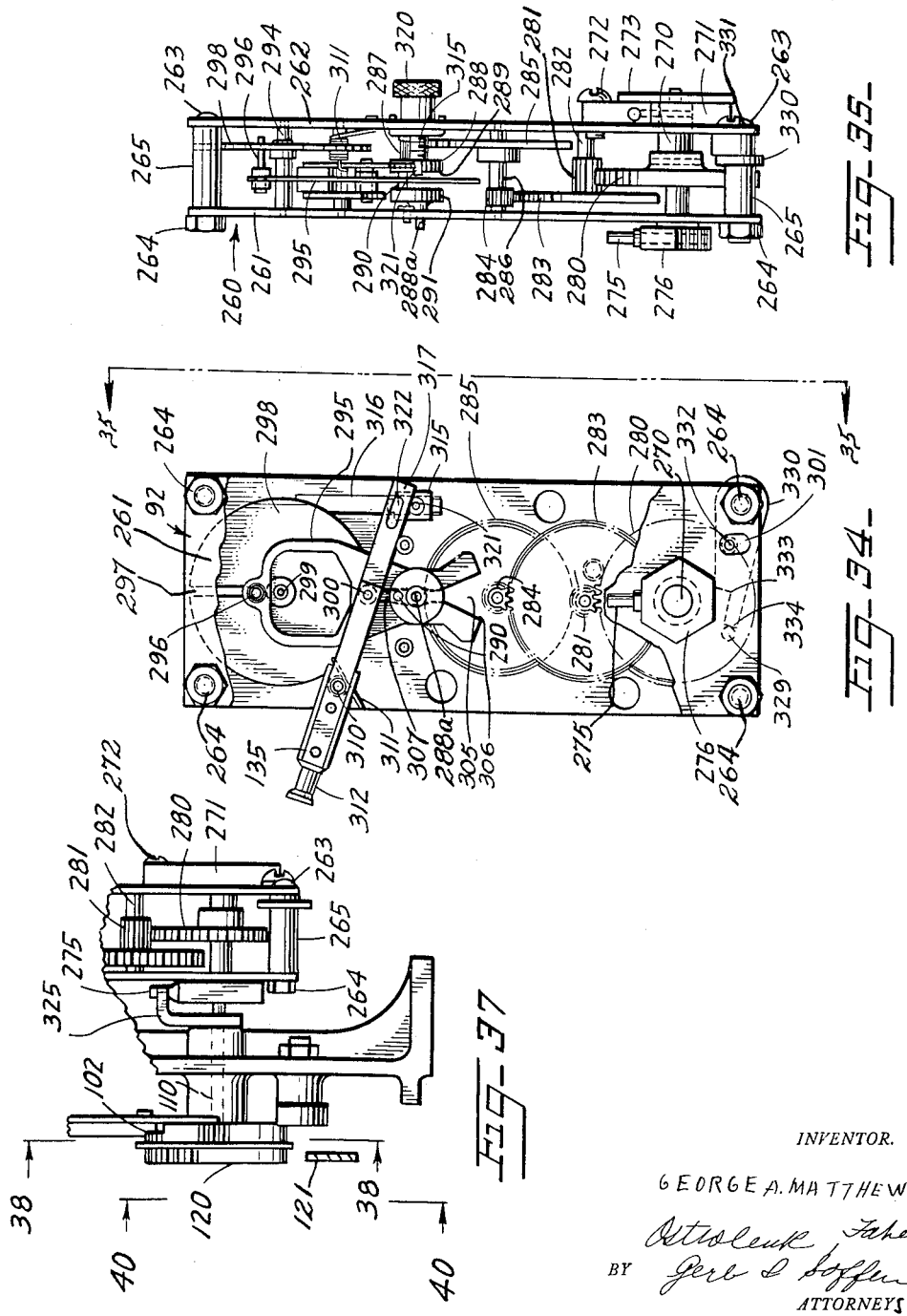
INVENTOR.
GEORGE A. MATTHEWS
BY
ATTORNEYS

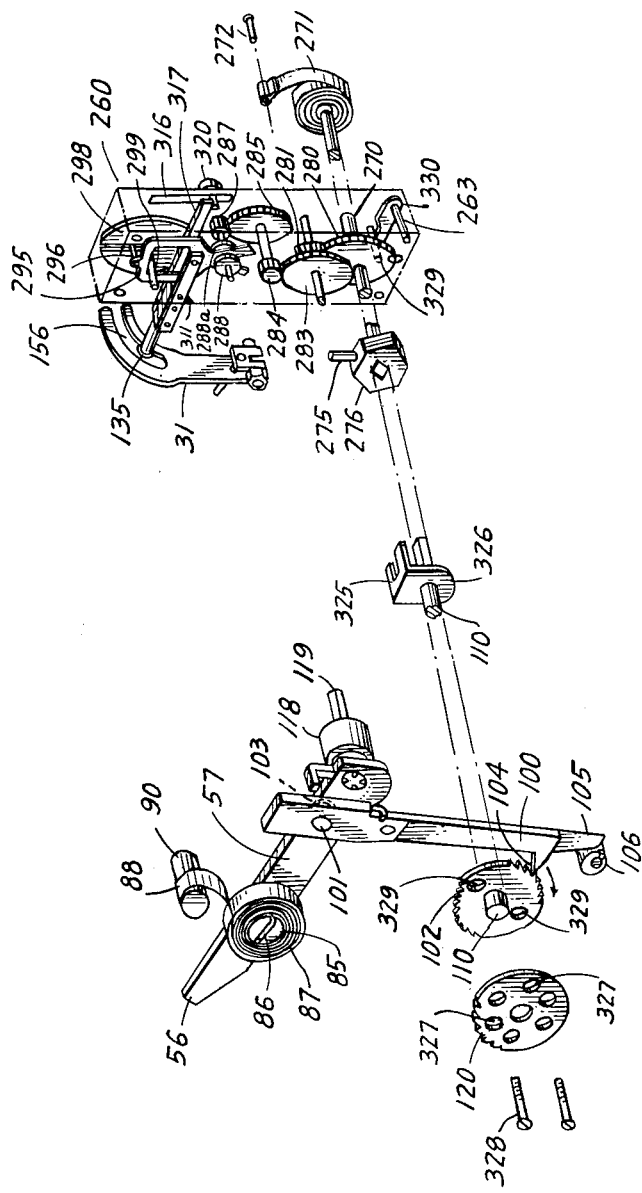

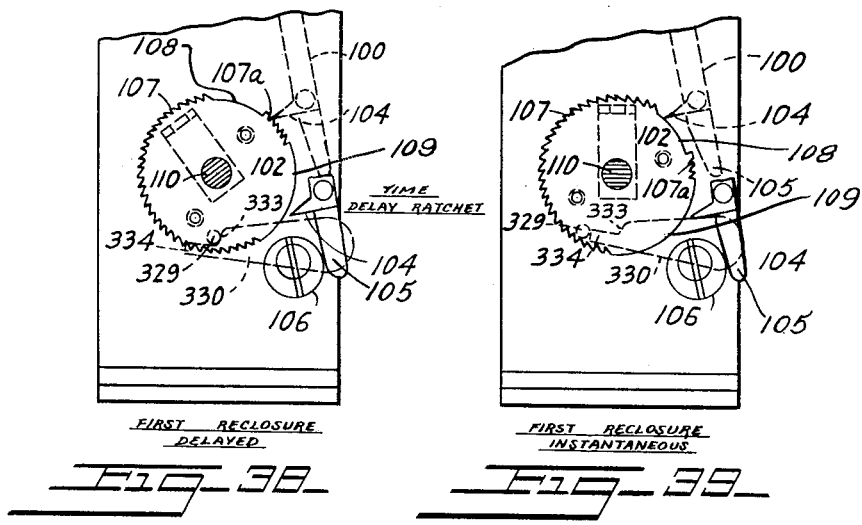
FIRST RECLOSURE DELAYED
Fig. 38
FIRST RECLOSURE INSTANTANEOUS
Fig. 39
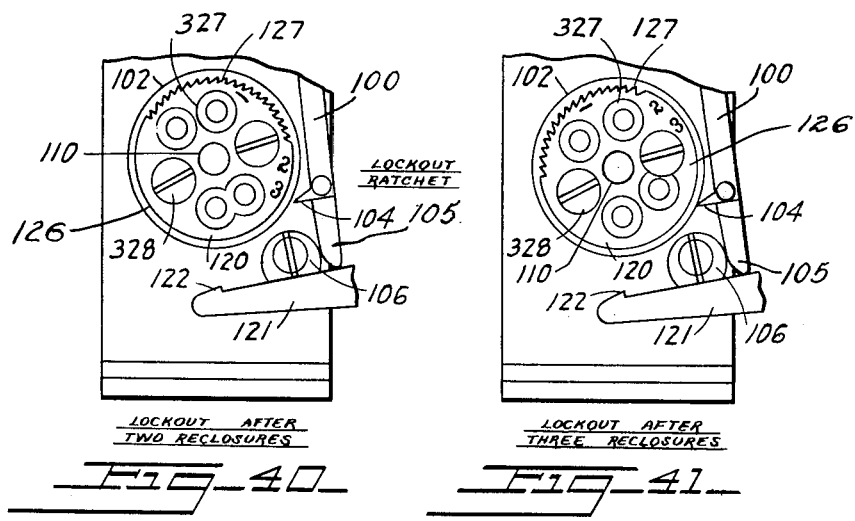
LOCKOUT AFTER TWO RECLOSURES
Fig. 40
LOCKOUT AFTER THREE RECLOSURES
Fig. 41
INVENTOR.
GEORGE A. MATTHEWS
BY
ATTORNEYS March 28, 1961 G. A. MATTHEWS 2,977,439
AUTOMATIC RECLOSER Original Filed Aug. 31, 1949 18 Sheets-Sheet 16

INVENTOR.
GEORGE A. MATTHEWS

BY
ATTORNEYS

March 28, 1961  G. A. MATTHEWS  2,977,439
AUTOMATIC RECLOSER
Original Filed Aug. 31, 1949  18 Sheets-Sheet 17
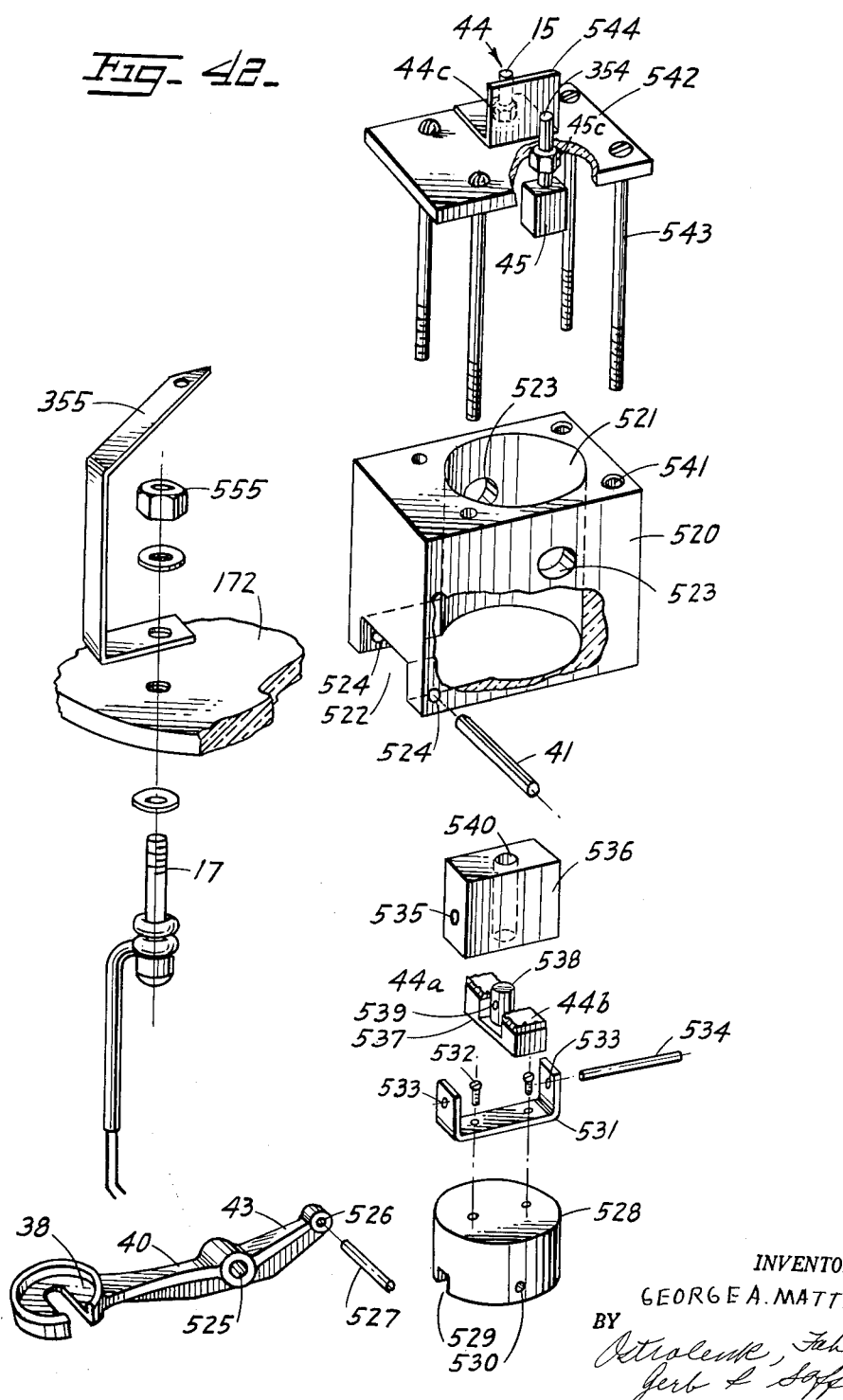
INVENTOR.
GEORGE A. MATTHEWS
BY
Ostrolenk, Faber,
Gerb & Soffen
ATTORNEYS

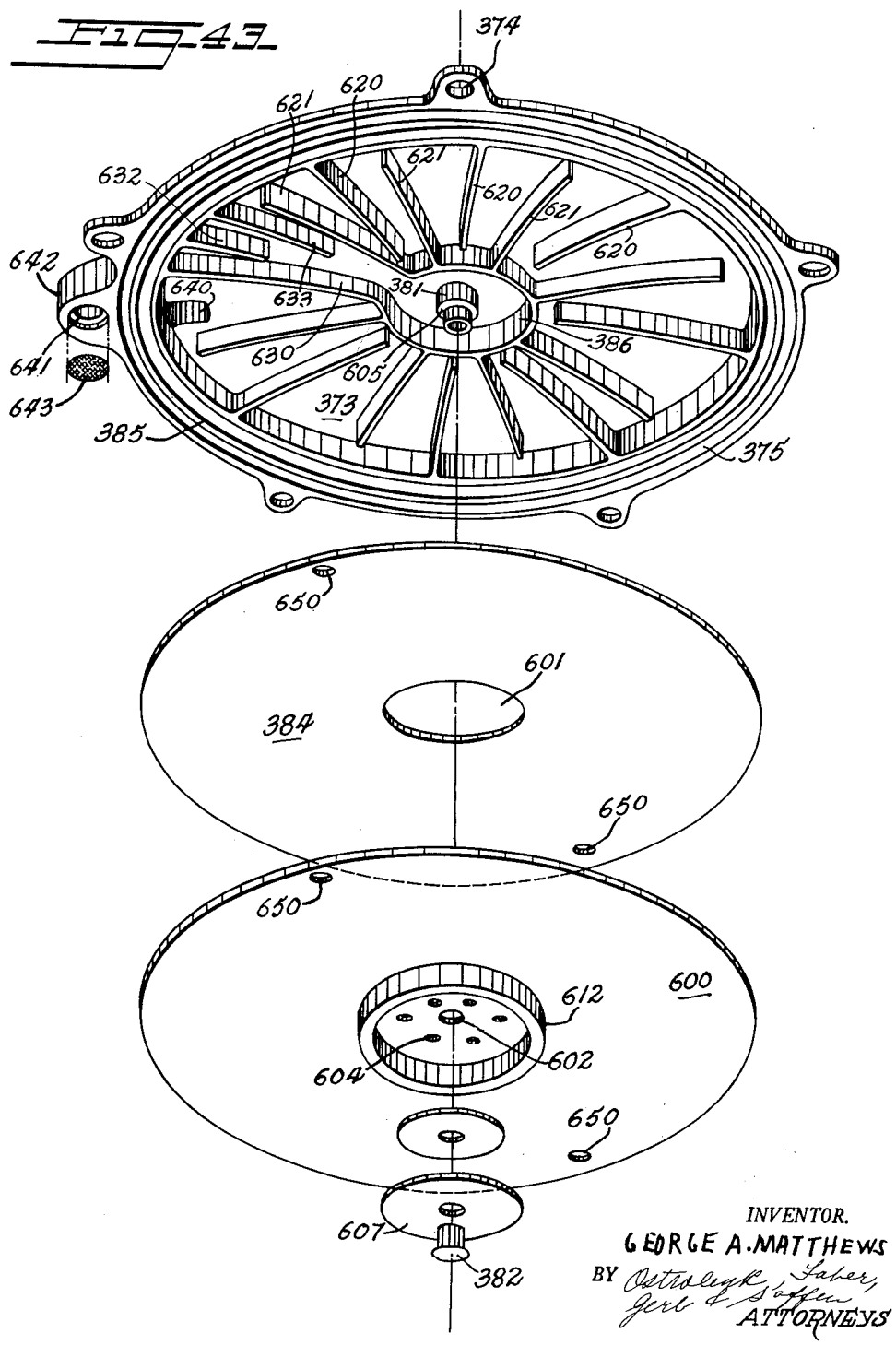

United States Patent Office

2,977,439
Patented Mar. 28, 1961

2,977,439
AUTOMATIC RECLOSER
George A. Matthews, Detroit, Mich., assignor, by mesne assignments, to I-T-E Circuit Breaker Company, Philadelphia, Pa.
Application Oct. 12, 1953, Ser. No. 396,962, now Patent No. 2,851,567, dated Sept. 9, 1958, which is a division of application Ser. No. 113,371, August 31, 1949, now Patent No. 2,738,394, dated Mar. 13, 1956. Divided and this application Oct. 3, 1957, Ser. No. 692,955

5 Claims. (Cl. 200—89)

This invention pertains to a self-contained fault current powered and actuated circuit breaker of the type now known as a recloser. The invention is a new combination of mechanisms forming a recloser that is an improvement over the forms of reclosers and interrupters disclosed in my earlier United States patent applications Ser. Nos. 753,085, 751,511, 611,617, 439,576, and 522,120 which have issued as Patents 2,118,355, 2,167,665, Re. 22,872, and 2,443,260, respectively, the latter application having not as yet been issued.

The instant application is a division of application Serial No. 396,962, filed October 12, 1953, now Patent No. 2,851,567, granted September 9, 1958, to George A. Matthews, entitled Automatic Recloser, which in turn is a division of application Serial No. 113,371, filed August 31, 1949, to George A Matthews, entitled Automatic Recloser, and now U.S. Patent 2,738,394.

In this present invention I have retained the novel principles of operating characteristics as set forth in the earlier patents wherein with fault current flowing the first opening stroke is instantaneous, followed by a reclosing stroke, and all subsequent opening strokes are time delayed, finally to a locked open position if the fault is not cleared by the opening strokes, or a resetting to position for an instantaneous stroke if the fault is cleared by the opening strokes short of reaching the locked open position.

My new invention provides a recloser which has in its combination, linkage for manual operation under normal loading conditions.

My new invention provides a recloser by which the overall time duration of fault current will not exceed 1¼ to 1½ cycles (60 cycle system) when the fault current exceeds 8½ times the continuous rating of the recloser. At this speed I have reduced the overall time of fault duration to 60% of that obtainable in the reclosers disclosed in my Patent 2,443,260 and application Serial No. 522,120. This reduction in time for fault duration has its advantage in that an overhead conductor is damaged to a lesser degree by the fault arc for the shorter duration. By referring to Figure 1 of my Patent Re. 22,872 and using No. 6 wire, for example, because it is the most generally used wire size for laterals, it is noted that this size conductor will burn off in 2½ cycles with a 1375 ampere arcing fault, whereas at 1½ cycles 2375 amperes are required to burn it apart at the arcing fault. For current values less than the above, which will not burn the conductor apart, the damage to the conductor is very substantially reduced due to the reduced duration of the arc.

This invention provides a recloser wherein the elapsed time between the initial opening stroke and the closing stroke can be acccurately adjusted to suit the characteristics of the circuit to which it will be applied.

This invention further provides a recloser in which the mechanism is adjustable to afford inverse time delay or definite time delay characteristic to the opening strokes after the initial instantaneous opening stroke, if on the initial closing stroke the fault current re-establishes as the result of the initial fault.

This invention also provides a mechanism in a recloser which can be adjusted and calibrated to regulate the time interval during which the fault current flows in the recloser, thereby satisfying the time-current tolerances necessary for proper coordination of reclosers with fuses and other protective devices generally operated in conjunction with reclosers. The use of the improved timing regulation for better coordination enhances the use of fuses in laterals, and the use of the smaller fuses, made possible by the improved regulation, will provide more reliable protection and performance. In this invention I am disclosing the time regulating mechanism.

My invention provides a recloser which, when closed after a lockout, has sufficient time delay to pick up the increased current usually encountered when energizing a cold circuit. That is to say that when the recloser is closed after a lockout, the delay mechanism will provide a time delay interval before tripping out, long enough for the load current to return to normal, at which value the recloser will not open to interrupt the circuit because the normal load is not sufficient to cause operation of the recloser.

My invention also provides a recloser which is dimensionally smaller than that disclosed in my earlier said patents. This recloser, within the same overall physical dimensions is commercially rated from 60 to 300 amperes continuous load current. The rating of reclosers can be changed by interchanging coils of proper ratings. That is to say that the 5 ratings of the recloser, in the above noted range, all fit the same housing or case.

Still further provision is made in this invention for a simplified mechanism and recloser as compared to those disclosed in my prior inventions hereinbefore noted. The new simplified mechanism and recloser thereby affords a lower cost unit to produce.

This invention also discloses a timer mechanism which through its connected regulating control provides improved time-current coordination which is desirable for service application. The timer mechanism has a novel free running characteristic which provides a 15 cycle minimum time delay, which is approximately 50% of that provided by the timers disclosed in my prior inventions. The new timer mechanism further provides accurate timing which is independent of temperature variations thereby contributing to the accuracy of regulation for controlling reclosers.

My new invention provides a recloser which, by introducing a high reactance into the fault circuit, causes a substantial reduction in the fault current magnitude prior to interruption. This high reactance is normally shunted from the circuit.

My new recloser provides a switching device which clears transient faults from a circuit by its instantaneous opening stroke and restores service to the circuit, after a few cycles of de-energization, by its fast reclosing characteristic. Service records show that at least 60% of the faults are transient; therefore, this recloser, with the above improved characteristics, is an advancement in the art of circuit protection.

My new invention also provides a recloser combination in which the main operating coil is not energized until the magnitude of the fault current is great enough to provide a full interrupting stroke for the interrupting contacts. This combination also provides for the elimination of contact "chattering" when the minimum value of operating current is approximated but not quite reached.

In order to provide the greatest economy in design and application, the recloser is spring operated to circuit closing position and operated to open position by an operating magnet energized by the fault current. The present recloser is, therefore, automatic and self-contained. The control elements are energized at circuit potential, thereby saving the cost of insulating the control from the line potential. If external low voltage control were used, it would be necessary to insulate the low control voltage from the elements of the recloser which are energized at the high potential of the line. Such insulation problems are, therefore, fully met by my invention wherein this insulation problem does not exist.

My recloser is fault current powered because as such it does not require external power for its operation. This results in the installed cost being considerably less than that for switchgear which requires external power for operation. The reclosers being self-contained also saves the cost and installation of external relays for controlling operation of the switchgear.

The power requirements of such an operating magnet, mentioned above, to operate the spring biased contacts of a relatively large circuit breaker are quite substantial and accordingly the operating magnet must be quite large. It is, therefore, not practical to maintain the operating magnet connected continuously in the power circuit due to the power loss of normal current flow therethrough. The operating magnet is, therefore, normally by-passed by contacts which are operated to disengaged position by an armature of a control magnet connected in series with the operating magnet as shown in Patent No. 2,433,260 and application Serial No. 522,120. The losses in the low-loss control magnet are easily dissipated to maintain operating temperatures in keeping with established limits. The by-pass control also makes it possible to produce reclosers of greater current carrying capacity than that possible without the by-pass control. This provision, therefore, permits production of reclosers in the larger power classification of switchgear suitable of either indoors or outdoor station mounting.

Inasmuch as full load currents and even momentary fault currents may flow over the by-pass contacts, these contacts themselves are relatively large. The control of the operating coil by by-pass contacts makes it possible to utilize a low-loss control coil in series with the main contacts.

Accordingly, an object of the present invention is to provide a novel control magnet construction for controlling the by-pass circuit around the operating magnet.

In operation, the recloser opens instantaneously and recloses after a predetermined time delay sufficient to permit a transient fault condition to cure itself.

In accordance with the present invention, the recloser, following disengagement of the contacts in response to a fault, is latched open. A time delay mechanism is then set into operation to release the latch after a predetermined interval following disengagement of the contacts to permit re-engagement by the closing spring.

In order to vary the timing control of the time control mechanism, a second armature is provided on the control magnet and is loosely coupled thereto magnetically. The second armature moves through a variable angle in accordance with the current value of the fault current flowing in the control magnet. This variable angular movement of the armature is achieved by providing a plurality of spring pressed stops for the armature, each at a different angle and presenting individual spring forces against movement of the armature. These stops are adjustable to provide control for shaping the time current to suit co-ordination requirements.

The variable angular movement of the armature in turn controls an adjustment of the time control mechanism to vary its timing control in accordance with the angular movement of the armature.

Accordingly, a further object of the invention is to provide a novel time delay control which is variably operated in accordance with the extent of the fault current.

Still another object of the invention is to provide a control magnet having an armature operated through variable distances in accordance with the fault current.

Another object of the invention is to provide a time control mechanism variably controlled by the control magnet.

Still a further object of the invention is to provide a novel control magnet having a first armature for controlling a by-pass circuit for an operating magnet and a second armature variably operated in accordance with a fault current for controlling a timing mechanism, which controls the latch.

Inasmuch as the recloser is magnetically operated open and spring operated closed and time delay for both reclosing and reopening the recloser is desired, a time delay mechanism which delays the spring closing operation and electromagnet reopening operation is desired.

To this end, the recloser is latched open following an opening operation and the time delay mechanism controls the time of release of the latch to permit spring operated reclosing of the contacts. The armature of the control magnet is now latched against operation in response to the energization of the magnet by fault currents in the line. The time delay mechanism operates to release only the latch after a predetermined interval to permit operation of the armature of the control magnet, in response to the fault current, which in turn removes the by-pass around the operating magnet.

During initial conditions the latch is only partially in engagement. This has the effect of predetermining the fault current value to which the control magnet will respond to move its armature instantaneously for opening the by-pass around the operating magnet. In subsequent operations the latch is fully set and achieves a time delay for the same fault current value. To simplify that, when the latch is only partially engaged the forces are such as to enable the armature to respond instantaneously when the fault current occurs, when the latch is fully set then no matter what the fault current the armature cannot move until the time delay has permitted it.

Thus while high speed closing by spring means and high speed opening by electromagnetic means is obtained, time delay in the release of these respective sources of operating energy is achieved by latching each of these elements for variable periods.

Therefore, an object of the present invention is to provide a novel recloser in which the contacts are latched out of engagement and the control magnet armature is latched against operation in response to energization of the control magnet.

A further object is to provide a novel recloser in which the contacts are latched out of engagement and the control magnet armature is latched against operation in response to energization of the magnet and in which a time delay mechanism releases the latch on the contacts and on the armature.

Still another object is to provide a novel control magnet for the operating magnet having an armature with a latch for preventing operation of the armature when the magnet is energized.

The degrees of energization of the control coil is, of course, dependent upon the current value in the circuit. The control coil may be adjusted by an appropriate pick-up calibrating screw so that it will attract the armature which operates the control switch at and above a predetermined current value. The pick-up calibrating adjustment screw simply calibrates a latch for this purpose, which latch does not offer a time delay but will yield at a predetermined energy level to permit instantaneous opening, the speed of which is determined only by the inertia of the parts to be moved.

As heretofore stated, the recloser is essentially a circuit breaker which opens and recloses several times. If the fault has not been cleared during the first opening operation, further trips and reclosures occur at definite intervals until the circuit remains energized or until the recloser locks open.

The first tripping operation of any series is always instantaneous (from ½ to 2½ cycles depending on the current magnitude), while subsequent trips occur after either an inverse or definite time delay depending on the setting of the timer mechanism included in the apparatus.

The first reclosing time is normally 30 cycles but a slower reclosing time of 5 seconds can be obtained by simple adjustment. Likewise, in circuits where fast reclosure is desired, the reclosing time on the first reclosure can be made as short as 6 cycles. The time delay on subsequent reclosures is preferably of the order of 5 seconds.

If, following a predetermined number of operations, the fault has not cleared, the recloser should be locked open. To this end a novel lock-out is provided which stops operation of the timing mechanism and prevents release of the principal latch after a predetermined number of operations. In such a case it is desirable to provide manual means which releases the latch to permit reclosing of the recloser when the fault condition has been corrected. It is further desirable to provide interlocking means to cause the lock-out to be inoperable when the breaker is in the closed position.

An object of the present invention, therefore, is to provide a novel construction for latching the recloser open after a predetermined number of operations thereof within a predetermined interval of time.

When the breaker is moving to locked-out position and during the reclosing timing interval, the timer arm is prevented from moving by a suitable lock-out ratchet. This interference prevents release of a closing latch. By external movement of suitable linkage the main operating arm is forced to the maximum open position. This movement releases a timer arm interference and allows the breaker to reset.

Simplicity and economy of design is achieved by providing four functions to the timer. Namely, means for segregating instantaneous and time-delay operations, a control time for opening and for reclosing and integrating the time for lock-out. A pin controls the pawl on the lock-out hereinafter described so that it is impossible for the breaker to lock-out with the circuit breaker contacts closed. Lock-out can only be achieved with the circuit breaker contacts in the open position, and this is accomplished in the present construction by a positive operation as noted above. It is possible in other devices, if there is an accidental missing on the ratchet teeth, to achieve a lock-out condition when the contacts are closed.

Another object of the present invention is to provide a control mechanism which automatically resets to a normal position if the number of reclosures and openings is not predetermined number in the predetermined time interval for lock out open.

Still a further object is to provide a novel manual control for release of the latch to permit reclosing of the recloser.

In order to utilize the same timer for both time delayed reclosures and locking out, the shaft of the timing mechanism is provided with two circular ratchets. A timer arm is provided and is connected by a pawl to the reclosing time delay circular ratchet.

After the first breaker opening and on the closing stroke, the timer arm, hereinafter described, attempts to contact one of the teeth on the time delay ratchet, but on the first reclosure there are no teeth on the ratchet in a position to be engaged by the timer arm; the pawl and timer arm accordingly slide down releasing the principal latch to permit the main contacts of the recloser to re-engage. After the release of the principal latch, the pawl engages a tooth on the ratchet and the remaining portion of the stroke is thereafter controlled by the time delay mechanism; the control magnet armature cannot operate its armature to open the by-pass circuit until the pawl and timer arm complete their downward movement. The timing mechanism thereafter controls the speed of return or reset of the ratchet.

If a fault still persists, then the recloser will again open before the ratchet has had time to return to its original position and the pawl on the timer arm will now engage a tooth on the ratchet, thereby rotating the ratchet under the control of the time delay mechanism during the full downward stroke of the timer arm and pawl. Since the first portion of the downward stroke controls the release of the principal latch, this release will take place only after a time delay; so that the reclosing of the main contacts after the second opening will take place only after this time delay. After release of the principal latch, the pawl and timer arm as in the case of the first reclosure are still under the control of the ratchet to time delay the release of the control armature. This last portion of the time delay is controlled as to speed in accordance with the magnitude of the fault or overload current, means being provided to speed up the operation of the timing mechanism in accordance with the intensity of the overload.

The resetting of the time delay, however, is always under the control of the timing mechanism, and this resetting is not speeded up at any time in resetting. Therefore, if a number of successive openings occur within a predetermined time, the ratchet mechanism will be rotated to a lock-out position, but if the breaker remains closed a time interval, greater than the predetermined interval, the timer resets to inoperative condition for instantaneous opening.

The reclosures occur a number of times until the second ratchet is rotated to a lock-out position which prevent reclosing. The second ratchet is smooth over the portion of its circumference initially in contact with a lock-out pawl and is provided with teeth over a relatively small section thereof. The lock-out pawl on the principal latch is arranged to engage the perimeter of the second ratchet.

The lock-out pawl is interlocked with the principal operating arm to preclude lock-out condition of the control when the main contacts are closed. A rigid pin on the principal operating arm holds the lock-out pawl out of registry with the lock-out ratchet at all times that the main contacts are engaged.

After a predetermined number of operations, the teeth of the second ratchet move into registry with the pawl so that on the next opening operation the pawl will be engaged by the teeth and the principal latch will be prevented from operating, thereby resulting in a locking open of the circuit breaker.

If desired, time delay on the first reclosing is avoided by omitting the teeth on the reclosing time delay ratchet at the position it would occupy at the first opening operation.

Appropriate operating mechanism for releasing the circuit breaker from its locked out position is provided accessible from outside of the circuit breaker housing together with suitable means for manually opening the circuit breaker at any time and locking it open.

The novel structure comprises a vertically arranged oil filled casing with stationary power interrupter contacts at the lower end thereof and a vertically movable plunger carrying an appropriate movable contact engageable with the stationary power interrupting contacts and operable in an arc interrupting chamber comprising a plurality of perforated lamina of insulating fibrous material, the aligned perforations forming a cylindrical chamber. The diameter of the movable plunger contacts and insulation secured to and movable with the plunger is substantially equal to the diameter of the aligned perforation, the slight decrease in diameter of the movable member with respect to the arc chamber making allowance being just sufficient for mechanical tolerances, such as normal expansion and contraction to permit unobstructed and free movement of the movable contact.

A rod of fibrous insulating material of substantially the same diameter as the movable plunger contacts is secured to and extends below the movable contacts so that the narrow angular arcing space is maintained for an arc extinguishing operation after the contacts separate. See Patents Nos. 2,167,665, 2,443,260, 2,118,355, Re. 22,-872, and application Serial No. 522,120.

The plunger carrying the movable contacts is biased downwardly toward closed position by a heavy reclosing spring. The movable plunger is an extension of the armature of an operating solenoid coil which when it is appropriately energized will attract its armature upwardly, thereby separating the main interrupter contacts against the spring bias.

The rod is preferably formed by turning the fibrous material on a mandrel to the desired diameter. This leaves a hollow cylindrical chamber inside the rod.

The recloser arc chamber is oil filled. Due to the cylindrical opening in the rod follower on the movable contact, air tends to be trapped therein.

To prevent this, an opening is provided in the rod to permit escape of air when the recloser is being filled with oil. This opening permits oil to be squirted therethrough during movement of the contact, thus assisting in arc extinguishing.

A further object is to provide a novel rod follower having an opening to its inner chamber.

A primary object of the invention is the provision of a novel automatic circuit interrupter and recloser designed primarily for the protection of distribution and/or sub-transmission circuits and combining within one structure instantaneous, definite inverse time tripping and lock-out characteristics and automatic reclosing features.

Another and corollary object of the invention is the provision of a novel automatic circuit recloser comprising timing mechanism operable in response to an opening operation of the circuit interrupter to provide selective time delay for the reclosing operation.

Another object of the invention is the provision in an automatic self-contained reclosing circuit breaker of novel control means responsive to current value in the line protected thereby for opening the contacts of the circuit recloser.

Another object of the present invention is the arrangement whereby the main operating coil provides the power for reclosing and for operating the timing elements. That is, the fault current and the voltage drop provide the energy to energize springs which close the main contacts and which drive the timing control.

Another object of the invention is the provision of novel time delay means controllable by contact opening control mechanism to control the reclosing operation of the circuit recloser.

Another object of the invention is the provision of a novel control coil and associated armatures for switchgear.

Another object of the invention is the provision of novel timing elements for controlling the operation of switchgear.

Another object of the invention is the provision and arrangement of the novel latch members for locking the switchgear in an open position after a predetermined number of openings of the main contacts.

Another object of the invention is the provision of novel manual operating and indicating means for switchgear.

The foregoing and many other objects of this invention will become apparent in the following description and drawings in which:

Figure 1 is an exploded schematic view in perspective of those operating elements of the novel automatic circuit recloser which are contained within the operating section of the housing of the circuit recloser.

Figure 2 is a schematic view in perspective exploded in two directions of those operating and indicating elements of the novel circuit recloser which are contained outside the housing, and the directly connected elements on the inside of the housing.

Figure 2a is a view in perspective corresponding to that of Figure 2 showing the elements of Figure 2 connected together in order to show the relationship of the various parts.

Figure 3 is a circuit diagram showing the circuit connections between the operating elements of the novel automatic circuit recloser.

Figure 4 is an exterior view in perspective of the novel automatic circuit recloser showing the same mounted for operation.

Figure 6 is a composite exploded view showing the main interrupter contacts and their relationship to the interrupting chamber and operating coil.

Figure 7 is a side view of the control elements shown schematically in Figure 1 contained in the control housing with the exterior operating elements of Figure 2 omitted.

Figure 9 is a top view of the control elements of Figure 7.

Figure 10 is a fragmentary top view corresponding to the right-hand portion of Figure 9 showing, however, the exterior control elements of Figures 8 and 2.

Figure 11 is a side view corresponding to approximately the center and right side of Figure 7 showing the timing mechanism, timing arm, timing ratchets, and lock-out latches.

Figure 12 is a view of the lock-out latch mechanism and associated elements taken from the right side of Figure 11.

Figure 13 is a view partly in cross-section taken from line 13—13 of Figure 9 looking in the direction of the arrows.

Figure 14 is a view partly in cross-section taken from line 14—14 of Figure 13 looking in the direction of the arrows.

Figure 15 is a side view of the control coil and its associated armatures taken from line 15—15 of Figure 7 looking in the direction of the arrows.

Figure 16 is a view of the opposite side of the control coil and its associated armatures.

Figure 17 is a view of the control coil taken from line 17—17 of Figure 15.

Figure 18 is a top view of the control coil and its associated armatures.

Figure 19 is a schematic view corresponding to that of Figure 16 but showing the trip position of the control coil.

Figures 20 to 27 are schematic views showing the successive positions of the latching mechanism in association with the timer mechanism. Figures 20 to 23 are relative to opening operation of the contacts, whereas Figures 24 to 26 are descriptive of reclosing and time delayed opening operations. Figure 27 schematically shows the position of these control elements in the lock-out condition after a specific number of openings and reclosures have occurred. Figure 23 is also descriptive of the position of the latches and associated mechanism for release after lock-out to permit reclosure.

Figures 28, 29, and 30 are schematic views showing the positions of the external operating elements of Figure 2 for different conditions of the automatic recloser.

Figures 31, 32 and 33 are additional views showing the position of the indicator and the principal operating arm of the plunger at positions corresponding, respectively, to the positions of Figures 28, 29 and 30.

Figure 34 is a side view with a part of the cover removed of the timing mechanism for use in connection with the control elements of my novel automatic circuit recloser.

Figure 35 is a view of the timing mechanism of Figure 34 taken from line 35—35 of Figure 34.

Figure 36 is an expanded view showing the connection of the timing ratchets to the timing mechanism and to the timer arm.

Figure 37 is a fragmentary view of the timing mechanism corresponding to the lower portion of Figure 35 and including the ratchet elements shown in Figure 36.

Figures 38 and 39 illustrate schematically the operation of the time delay ratchet.

Figures 40 and 41 illustrate schematically the operation of the lock-out ratchet.

Figure 41A:
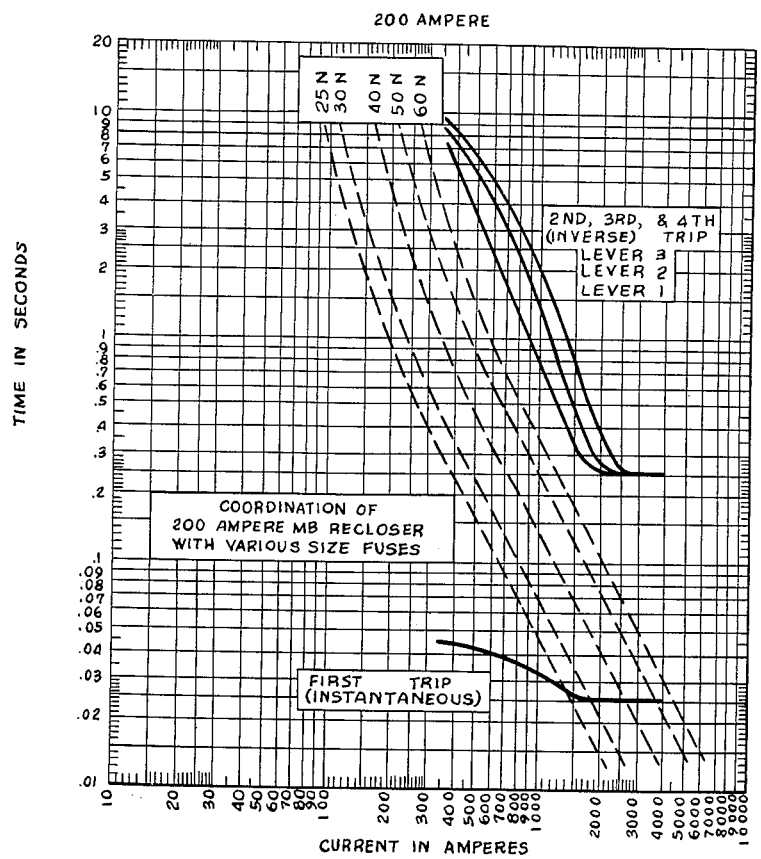

Figure 41a is a time-current graph which shows the high degree of coordination of my recloser instantaneous and inverse time-current regulation with that of several sizes of standard fuses. The inverse time-current curves on this chart are also representative of the time-delay regulation afforded by the new recloser.

Figure 42 is an exploded view of the control relay contact elements.

Figure 43 is an exploded view in perspective of the cover of the housing of my novel recloser.

Referring first to Figures 1 and 3, there is here shown schematically the novel automatic recloser which is essentially a circuit breaker so arranged that it is biased closed and may be opened by an opening coil the armature of which carries the movable contact, the opening operation being against the bias of the closing spring.

I. Interior operating parts

The operating mechanism which controls the opening movement and also time delays the reclosure and which mechanically defeats the closing spring after a predetermined number of reclosures is all shown schematically in Figure 1.

All of the elements of Figures 1 and 3, except of course the external terminals 10 and 23 as well as other elements, are contained within a casing of the type shown in Figure 4, the operating elements of Figure 1 being located in the operating chamber of the casing and the moving contact plunger of the stationary main contact and the operating coil being positioned in a lower chamber below the upper operating chamber.

Ia. Circuit connections and general operation

During normal operations, the electrical elements of the recloser are connected in series with the power line at terminals 10, 23 which is to be protected by the recloser. This circuit extends from terminal 10, conductor 11, connector 341, through winding 12 of the control magnet conductors 14, connector 15, contacts 45 and 44 bridged by switch operating member 537, conductor 354A to connector 172 and lead 18, to rod 20, stationary contact 21, 22 to the power line terminal 23.

It will be noted that with contact 537 bridging the contacts 44, 45, the winding of operating magnet 24 is by-passed so that normally substantially no current flows through and, therefore, there is substantially no loss due to current flowing in this winding. However, the windings of control magnet 12 are connected in series with the power line and are, therefore, energized by line current. On predetermined energization of the control magnet 12, in response to a fault current in the power line, lever 40 which carries contact 537 is moved, as will hereinafter be described, to open the bridge across contacts 44, 45, thereby inserting the winding of operating magnet 24 in series with the winding of control magnet 12 and the power line. Magnet 24 is now energized in response to the fault current to operate its rod 20 to contact disengaged position.

Following separation of the main contacts 21 and 20A, the arc which is formed on the opening of the circuit at that point is extinguished and results in de-energization of the operating coil 24. Thereupon the closing spring hereinafter described drives the plunger 20 down to re-establish current carrying connections between the main movable contact 20A and the main stationary contact 21.

The operating mechanism shown schematically in Figure 1 is designed to provide appropriate controls for circuit opening operations and for the reclosing operations, so that successive reclosing operations may take place with a desired time delay interval between them and so that the plunger 20 may be locked in the up or disengaged position after a predetermined number of reclosing operations.

Ib. Control coil and associated armatures

The control coil 12 is arranged so that in response to a fault current of predetermined value in the circuit which is protected control coil will be sufficiently energized to move solenoid armature 25 connected to the control switch 16 and thus to open the control switch.

The control coil 12, therefore, is the initial operating coil of the entire system. Control coil 12 is essentially a solenoid coil surrounding the armature 25 which is normally biased above the coil by compression spring 26 in the manner hereinafter described.

The armature 25 is preferably a laminated iron structure, a portion of which forms together with the laminated magnetic rectangular plates 27a and 27b and with 27d and 27c, magnetic paths for the flow of flux in response to energization of the control coil 12.

The magnetic path 27 includes the additional armature 28 which is secured to the rotatable shaft 29 so that portion 30 thereof is in engagement with the top leg 27b of the magnetic flux path.

For ordinary current values flowing through control coil 12, magnetic flux through the legs 27a, 27b, 27d and 27c of the magnet is not sufficient to attract the armature 28.

However, where a predetermined current value is exceeded, i.e., a fault current flows in the line, section $27b_1$ of the leg 27b of the magnet becomes saturated and the resultant magnetic flux passing from leg 27b through the armature 28 and across the air gap 31a results in attraction of the armature 28 toward the magnet 27. This results in rotation of the shaft 29 and the curved timer adjustment fork 31 mounted on shaft 29.

Thus, the control coil 12 had two immediate functions when energized to a predetermined value in excess of normal current value: (1) it attracts the armature 25 against the bias of compression spring 26 and (2) it attracts the armature 28 against the bias of the spring assembly 32 of the armature 28, which spring assembly is also hereinafter described.

Ib(i). Connection of control coil armature and toggles to control switch

The upper end of armature 25 is connected by pin 33 to the lever 34 which is pivotally mounted on the stationary pivot 35. The opposite end of the lever 34 is connected by pivot 36 to the connecting rod 37. The lower end of connecting rod 37 is connected by pin 38 to the control switch operating lever 40.

Control switch operating lever 40 is pivotally mounted on the pivot 41. Compression spring 26 compressed between the stationary collar 42 and the end of lever 40 at pivot 38 surrounds the connecting rod 37.

Compression spring 26 drives the lower end of connecting rod 37 and therefore the left-hand end of control switch lever 40 downwardly, thereby pulling down the right-hand end of lever 34, lifting up the left-hand end of lever 34 and exerting an upward initial bias on pin 33 and armature 25. Spring 26 by this means normally maintains the armature 25 in the raised position partly outside of the control coil 12 as shown in Figures 1 and 16.

The right-hand end of the control switch lever 40 is provided with the contact section 43 normally bridging the stationary contacts 44, 45 of the control switch 16 and being held in bridging engagement therewith by the compression spring 26 which drives the left-hand end of lever 40 down as previously described.

On energization of control coil 12 to a sufficient value, armature 25 is moved, rotating lever 34 in a counterclockwise direction around pivot 35 and raising the connecting rod 37 upwardly against the bias of compression spring 26.

This results in a clockwise rotation of lever 40 and the movement of the bridging contact 43 away from the stationary contacts 44 and 45 of the control switch 16.

Accordingly, the current value at which the control coil 12 will be energized sufficiently to attract the armature 25 may be determined by the compression of compression spring 26 and may if desired (but not preferably) be calibrated by making collar 42 adjustable.

The "drop out" characteristic of the control relay is important. It is desirable for reclosers to have this feature in order to protect the normally shunted operating coil from carrying load currents which would burn them out. In case that a fault clears from a line (such as by self-clearing or by the blowing a distribution transformer primary fuse) before the power contacts have had time to open but after the control contacts have opened, the load current returns to normal.

Unless a high "drop out" value is afforded, the control armature stays in the fully attracted position by the load current, thereby holding the control contacts open. This causes the load current to pass through the operating coil which is normally shunted. The drop out value should be at least 80% of the full load rating. The present recloser provides suitable drop out by including a non-magnetic plate (Figure 15) which prevents the armature from sealing in against the magnetic pole face.

Ib(ii). *Control coil calibration*

However, a simpler and more accurate degree of adjustment is provided by the opening latch 50 keyed to and mounted on the rotatable pin 51, the opening latch 50 being spring biased in a clockwise direction with respect to Figure 1 toward latching position by the coil spring 52.

Pin or shaft 51 carries the lug 53 secured thereto and rotatable therewith, which lug carries at its outer end the pick-up calibrating screw 54 which is adjustably mounted in the lug 53 for upward and downward movement on rotation of the screw 54 and which may be locked in the adjusted position by the locknut 55.

The lower end of the pick-up calibrating screw 54 bears against the forward end 56 of the timer arm 57. The opening latch 50 is provided with the latching detent 60 so arranged that it provided a detent or ledge against which the roller 61 at the end of lever 62 may bear.

Lever 62 is pivotally mounted on the stationary pin 63. The end thereof opposite the roller 61 is in toggle relation with the link 64, being connected thereto by the knee pin 65. The opposite end of toggle 62—65—64 is connected by pin 66 to the upwardly extending arm 67 of the lever 34.

When, therefore, the armature 25 is attracted downwardly by energization of the control coil 12 to rotate the lever 34 in a counterclockwise direction, it not only must compress the spring 26 but also must operate against the holding force of the latch 50 so that the toggle 62—65—64 may collapse to the position shown in Figure 19.

The armature 25, therefore, cannot be pulled down by coil 12 unless the roller 61 bearing against the latching detent 60 displaces the opening latch 50 in a counterclockwise direction with respect to Figure 1 or in a clockwise direction with respect to Figure 19.

The pick-up calibrating screw 54 bearing against the forward end 56 of the timer arm 57 determined the angular position of the pin 51 and the opening latch 50 thereby determining the degree to which the latching detent 60 of the opening latch 50 underlies the roller 61 at the end of toggle 62—65—64. Pin 63A bearing on the top surface of lever 62 ensures that roller 61 will ride in latching detent 60.

The degree to which the detent 60 underlies the roller 61 determines the initial force required to displace the opening latch 50 in order to permit the armature 25 to be moved down by coil 12. The greater the displacement of the opening latch 50 in a counterclockwise direction (with respect to Figure 1) the less force required to bush the roller 61 off the latching detent 60 to rotate the opening latch 50 from the position of Figure 16 to the position of Figure 19.

The greater the adjustment of the latch 50 in a counterclockwise direction with respect to Figures 16 and 19 the greater the force required for this displacement.

Accordingly, the adjustment of pick-up calibrating screw 54 which determines this initial angular displacement of the opening latch 50 determines the force and hence the over current condition required before initiation of operation of the apparatus.

When, however, this displacing force is reached, armature 25 is pulled down by control coil 12; roller 61 of toggle 62—65—64 rolls off the latching detent 60 and against the side of the opening latch 50; the opening latch 50 is rotated in a clockwise direction to the position of Figure 19 while toggle 62—65—64 collapses to the position of Figure 19; the connecting rod 37 is raised; switch operating lever 40 is rotated, and bridging contact 43 moves out of engagement with the stationary contacts 44 and 45 of the control switch 16.

With the control switch 16 thus opened, the full current passes through the operating coil 24 which attracts the plunger 20, pulling it upwardly and separating the main movable contact 21 from the main stationary contact 22 to open the circuit.

The upper end of the plunger 20 is connected to the operating arm 70 by the yoke connection 71 in a manner hereinafter more specifically described in connection with Figures 13 and 14 in such manner that the upward movement of plunger 20 must necessarily result in upward rotation of operating arm 70 and downward movement of the plunger 20 must necessarily result in downward rotation of the operating arm 70 and vice versa.

Ic. *Timer arm and associated latches and time delay ratchets*

The structure of the operating arm 70 will be more fully understood in connection with the description of Figures 1, 2, 7, 9. For purposes, however, of review of the entire operation, it is sufficient to point out for the present that operating arm 70 is rotatably mounted on the stationary pivot 75 at the end opposite its connection at 71 to plunger 20.

Operating arm 70 carries intermediate its ends and extending transversely with respect thereto the pin 76 on which are rotatably mounted the main latch roller 77 and the pawl 78. Pawl 78 is essentially a bell crank lever in form having a timer arm engaging leg 79 for engagement with arm 57 in the manner hereinafter described and a downwardly extending positioning leg 80.

In the normal at rest position of the operating arm 70, shown schematically in Figure 20, the positioning leg 80 of pawl 78 is driven by coil spring 82 against the stop pin 81 carried by the operating arm 70.

The timer arm 57 as is shown in Figures 1 and 7 is provided with a slotted pin 85 receiving the end 86 of coil spring 87. Coil spring 87 is wound around the slotted pin 85 and the outer end 88 thereof is connected to the stationary pin 90 carried (see Figures 1, 7, and 9) in the lug 91 (not shown) extending from the side of the timing mechanism housing 92.

Coil spring 87 is so adjusted that the timer arm 57 in the normal closed circuit position of the apparatus is substantially horizontal. When the timer arm 57 is rotated in a counterclockwise direction with respect to Figures 1 and 7 and clockwise with respect to Figure 20, the coil spring 87 is tensioned tending to rotate the timer arm 57 back toward the substantially horizontal position.

Timer arm 57 has a rearward extension 95 with a rounded under surface 96 which will be engaged by the upper surface of leg 79 of pawl 78 when the operating arm 70 begins to rise (compare Figures 20 and 21) during the upward movement of the plunger 20.

Thus, as the operating arm 70 rises, the pawl 78 lifts the rear end 95 of the timer arm 57 rotating the timer arm as above described and thereby lifting the time delay pawl lever 100 which is connected by the pin 101 to the timer arm 57 between the pin 85 and the end 95 of the timer arm 57.

Time delay pawl lever 100 is biased in a clockwise direction toward the time delay toothed ratchet 102 by the coil spring 103. Time delay pawl lever 100 is provided with the pawl tooth 104 which bears against the time delay circular ratchet 102.

Lever 100 also is provided with the extension 105 below the pawl tooth 104 having a cammed surface which bears against the pin 106 carried by the housing 92 of the timer mechanism and which in the normal at rest position of the operating mechanism with the switch contacts closed maintains the pawl tooth 104 out of engagement with the surface of the time delay ratchet 102 as shown in Figure 20.

Pin 106 is rotatable and is cam-shaped to provide adjustment of the disengaging point of pawl 100. This is shown in Figure 11.

When, however, the operating arm 70 is raised about its pivot 75 owing to the lifting up of the plunger 20 by the operating solenoid coil 24 and pawl 78 thus lifts the end 95 of the timer arm 57, the time delay pawl lever 100 is lifted; and as soon as its extension 105 clears the pin 106, coil spring 103 drives the pawl tooth 104 against the surface of the time delay ratchet 102.

This is shown diagrammatically by a comparison of Figures 21 and 22.

The pawl tooth 104 of the time delay pawl lever 100 rides up the surface of the time delay ratchet 102 without rotating the same owing to the curvature of the teeth 107 of the ratchet 102 (see also Figures 38 and 39) and also owing to the fact that certain portions 108, 109 may be made smooth and without the teeth 107 for purposes hereinafter more specifically described.

Ic(i). *Reclosing time delay*

From the description thus far, it will be apparent that in response to a predetermined fault current, control magnet 12 was energized, opening the shunt switch around operating magnet 24. Magnet 24 was then energized in response to the fault current and the circuit breaker contacts opened instantaneously. The contacts are latched in open position. At the same time energy was stored in a spring 512 which, now under control of a time delay mechanism, operates to release the principal latch.

As will be described more fully hereinafter, contacts 21, 22 are opened in an arc chamber in which the resultant arc following circuit interruption is extinguished. The operating magnet 24 is de-energized and the plunger 20 is now operable under action of a biasing spring 512 to reclose contacts 21, 22 as soon as the time delay releases the latch.

The ratchet 102 is keyed to the timer shaft 110 which is under the control of the timing mechanism 260 Figure 7 within the timing mechanism housing 92. Assuming that the first reclosure is to be delayed, then the teeth 107a (Figure 38) of ratchet 102 are so positioned, also in a manner hereinafter described, that the pawl tooth 104 will engage the teeth 107a at the upper limit of movement of the timer arm 57, lever 100 and pawl tooth 104 as shown in Figure 24.

Figure 23 shows the fully open position before reclosure starts. Timer arm 57 is held up by pin 121a.

At this time, the leg 79 of pawl 78 has been moved through a sufficient arc by rotation on pin 76 to disengage the curved under surface 96 of the rear extension 95 of the timer arm 57, Figure 22, and the end 95 of the timer arm 57 is released to move downward and hence the time delay pawl lever 100 begins to descend as indicated in Figure 24.

This descent is, however, delayed by the timing mechanism 260 in timing mechanism housing 92 which controls the rotation of shaft 110 and timing arm 57 cannot move instantaneously back to its original position under the influence of coil spring 87 but returns with a timed movement determined by the speed at which the timing mechanism in housing 92 permits the pawl tooth 104 to drive the time delay ratchet 102.

The main latch roller 77 seats in the latching detent 112 just prior to the disengagement of pawl end 78 from timer arm end 96, as shown in Figure 22. The principal latch 113 constitutes a lever arm pivotally mounted on the stationary pin 114 and biased toward the main latch roller 77 by the coil spring 115.

When the main latch roller 77 carried by the operating arm 70 which is connected at 71 to the plunger 20, therefore, seats in the latching detent 112, the operating arm 70 and the connected plunger 20 are locked in the up position as shown in Figure 25. This latching operation is accomplished by making the up stroke of plunger 20 and arm 70 sufficient to lift latch roller 77 above latching detent 112 high enough to ensure that pawl 78 will disengage the timer arm 57. Latch roller 77 then moves down slightly with arm 70 and plunger 20 to rest on detent 112.

As previously pointed out, a compression spring 512 hereinafter described, has been compressed by the upward movement of plunger 20 to bias the plunger 20 downwardly to the position in which contacts 21 and 22 will engage. This compression spring is, however, defeated by the interengagement of the main latch roller 77 with the latching detent 12 of the principal latch 113.

The principal latch 112 has a U-shaped extension 117 arranged in the path of movement of roller 118 carried on pin 119 at the rear end 95 of the timer arm 57 as shown in Figure 7.

As the timer arm 57 returns toward its original position under the influence of coil spring 87 and delayed by the time delay mechanism in housing 92 which acts through the time delay pawl lever 100 on timer arm 57, a device such as roller 118 engages the end of the U-shaped extension 117 of the principal latch 113 and pushes the latch 113 back far enough so that the latching detent 112 moves out from under the main latching roller 77 permitting the reclosing spring 512 to drive the plunger 20 and the operating arm 70 down to effect re-engagement of contact 21, 22. See Figure 25.

Accordingly, it is the return movement of the timing arm 57 which disengages latch 113 from the main latching roller 77 and the time delay which operates on the timer arm 57 determining the degree to which reclosure will be delayed.

The timing mechanism may, therefore, be adjusted to any desired speed and this adjusted speed will be effective to control the return movement of the timing arm 57, which in turn will control the unlatching of the operating arm 70 and the plunger 20.

After the completion of the clockwise rotation of timer arm 57 the curved extension 105 of the reclosing time delay pawl lever 100 moves against the pin 106 to move the pawl tooth 104 out of engagement with the teeth 107 or 107a of the time delay ratchet as the case may be (Figure 38).

At this time, the timing mechanism which was wound up by the rotation of ratchet 102 by timer arm 57 in a clockwise direction with respect to Figures 1 and 38 and a counterclockwise direction with respect to Figures 20 to 27 will now be free to rotate the time delay ratchet 102 and its shaft 110 back to the original or neutral position.

This return movement of the timer shaft 110 and the time delay ratchet 102 will, however, be under the control of the timing mechanism. The time for the return of the time delay ratchet 102 will not necessarily be the same as was required for the original movement. In the first place, the spring 87 which causes the forward movement and the spring in the timer hereinafter described which causes the return movement are of different strengths and, in addition, the return movement is always at the same rate, which is the slowest speed of operation of the timer. On the other hand, the forward movement, which consists of two parts, is at a slow rate for the first portion of its travel. This rate is not necessarily the same as under the return portion since a much heavier spring is operated. In addition, the second portion of travel in the forward direction is under the influence of the heavier spring and at a variable rate of operation depending on the magnitude of the short circuit current as hereinafter described.

If this return movement is completed before the next opening operation, then the next opening operation occurs as if it were the first opening operation of a series and the first and subsequent reclosures will occur as if they were the first of a series.

If, however, this return movement has not been completed before the next opening operation, then on the next opening operation, pawl 104 will engage teeth 107 of the time delay ratchet 102 at a position angularly displaced from the first engagement. The main latch roller 77 will be engaged and held by the latch 113 and the timer arm 57 will again descend under the control, however, of the timing mechanism in housing 92 translated to the timer arm through the timer shaft 110, ratchet 102, and lever 100.

If the next opening of the circuit breaker occurs before the timing mechanism in housing 92 has had an opportunity to begin to return the ratchet 102 and shaft 110 back toward the initial position, then the return of the timing arm 57 under the control of the time delay mechanism will add cumulative angular rotation to ratchet 102 and shaft 110.

Ic(ii). Lockout

The time delay mechanism is adjustable as to the speed of operation by adjustment of stop 315 (Figure 34) in slot 316 by clamping screw 320 as described below in connection with the specific description of the timing mechanism (Figures 34 and 35) in order to manually adjust the mechanism for faster or slower reclosing as conditions may require.

It is essential in the operation of the novel circuit recloser that the contacts be locked open after a predetermined number of reclosing operations.

Thus, in the event the initial cause for opening of the contacts was some transient fault in the line, the recloser may close and remain closed. An example is the case of some accidentally maintained arcing over at an insulator on the line owing to an unusual transient condition, in which case momentary interruption of current occasioned by one opening and reclosure of the contacts will result in extinguishment of the arc which will not then ordinarily reignite owing to the fact that the ionized gases would normally be blown away or otherwise cooled. This will also be the case if wires have accidentally swung together in a high wind.

Moreover, if some relatively high resistance member has caused the fault, the first or second reclosure of the automatic recloser may serve to burn away the cause of the fault and the automatic recloser contacts should then remain closed to maintain the circuit after the fault has been burned away.

If, however, the opening of the contacts resulted from a true short circuit condition which will not be cleared by repeated openings and closings of the automatic recloser, it then becomes essential to lock the automatic recloser open. This is the principal reason for making the angular movements of the time delay ratchet 102 and the timer shaft 110 cumulative on rapidly repeated reclosures.

After a predetermined number of such reclosures as after the second or third reclosure, this cumulative rotation of the reclosing time delay ratchet 102 and the timer shaft 110 may be utilized to bring a lock-out mechanism into operation.

The lock-out mechanism comprises a lock-out ratchet 120 on the timer shaft 110 co-axial with but spaced from the reclosing time delay ratchet 102 and a lock-out pawl lever 121 having a pawl tooth 122 and connected at its opposite end by pin 123 to the principal latch 113.

A coil spring 125 biases the lock-out pawl lever 121 upwardly so that the pawl tooth 122 bears against the surface of the lock-out ratchet 120. The lock-out ratchet 120, as is seen in Figures 40 and 41, is smooth at 126 over a substantial portion of its surface and is provided with teeth 127 over another portion of its surface.

In the original condition of the elements, after a first opening, the pawl tooth 122 engages the smooth section 126 of the surface of the lock-out ratchet 120 whenever the latch 113 is in latching engagement with the roller 77.

After a repeated number of reclosures, however, reuslting in cumulative rotation of the timer shaft 110, time delay ratchet 102 and lock-out ratchet 120, the teeth 127 of the lock-out ratchet 120 move into position to be engaged by the pawl tooth 122 on the next opening operation when the latch 113 next moves to a position where it receives and holds the latch 77.

When on an opening operation the latch 113 engages the roller 77 to lock the operating arm 70 and plunger 20 in the up position and when the pawl tooth 122 engages the teeth 127 of the lock-out ratchet 120, remember that the ratchets 102 and 120 are rotated in a clockwise direction with respect to Figures 38 and 40 as the timer arm descends, the teeth 127 are so curved that they will be locked by the pawl tooth 122 for such clockwise rotation and the pawl tooth 122 on the lock-out pawl lever 121 will prevent such further rotation by the timer shaft 110 and ratchets 102 and 120.

Hence, the timer arm 57 and its pawl lever 100 cannot now descend and the automatic recloser mechanism is now locked out as shown in Figure 27. This is true since, as pointed out above, it is the descent of the timer arm that is necessary to push the principal latch 113 away from the latching roller 77; and the timer arm cannot now descend.

The lock-out ratchet 120, as hereinafter described, may be made angularly adjustable about the shaft 110 so that the angular position of shaft 110 at which the teeth 127 move into conjunction with the pawl tooth 122 may be determined or set in accordance with the number of reclosures to be had before the lock-out position is reached.

The interlock arrangement definitely does not permit lockout with the main contacts closed. Pin 121 holds lockout pawl 122 away from lockout ratchet 120.

The dashpot unit 130 pivotally mounted on pin 131 and connected to pin 119 of timer arm 57 may provide a time delay on the first reclosure of about thirty cycles rather than the six cycles which may be obtained without the dashpot unit. The reason that the device would operate so fast (six cycles) without the dashpot is that the timer does not function at all on the first reclosure because of the flat spot on the time delay ratchet 102, as described previously. The dashpot is utilized where it is desired to increase this time delay from six to thirty cycles.

By adjusting stop 330 (Figure 34) by means of screw 332, it is possible to relocate the normal or reset portion of the timer and, therefore, the time delay ratchet 102. If this is done, the flat spot is moved in a counterclockwise direction (Figure 39) as shown in Figure 38, and then the detent 104 engages with a tooth and thus provides the full five seconds delay on the first reclosure due to the influence of the timer.

Ic(iii). Inverse time delay on reopening

When the contacts 21—22 open, on the lifting of the plunger and operating arm 70, then, as stated hereinbefore, the control coil 12 is de-energized and spring 26 returns the control switch 16 and the control armature 25 back to their original positions with the control unit returning from the position of Figure 19 back to the position of Figure 16. Owing to the fact that the end 95 of the timer arm 57 is raised, the forward end 56 of the timer arm 57 is lowered and thus it moves away from the pick-up calibrating screw 54.

Consequently, coil spring 52 may now drive the opening latch 50 to a position where its detent 60 locks under the roller 61 of toggle 62—65—64. The latching detent 60 owing to the fact that the pick-up calibrating screw 54 at this point has nothing to rest on because of the lowering of end 56 of the timer arm 57 moves sufficiently under the roller 61 so that it absolutely locks the roller 61 and so that the roller 61 cannot push the opening latch 50 out for a tripping operation.

Energization of control coil 12 after closing of contacts 21—22 by descent of plunger 20 after release of latch roller 77 cannot now pull down the armature 25 to reopen the control switch 16 until the timer arm 57 completes its full return to its original position.

At this time, thereby permitting the reopening time delay hereinafter described to be effective, the end 56 of the timer arm 57 lifts the pick-up calibrating screw 54 to rotate lug 53, pin 51, and latch 50 back to the calibrated position at which the control coil, if properly energized, will pull down the armature 25 with sufficient force to cause the roller 61 to push the latch 50 aside.

As previously pointed out, after the timer arm 57 in its return movement under the control of the time delay ratchet 102 causes the latch 113 to release the main latch roller 77, the closing spring hereinafter described closes contacts 21 and 22 to re-establish the flow of current through the automatic recloser.

At this time, the switch 16 has been closed establishing a by-pass for the operating coil 24 and, therefore, the contacts remain closed. This reclosing of the circuit breakers occurs before the end 56 of the timer arm 57 has reached the pick-up calibrating screw 54.

Accordingly, the latch 50 and its detent are so located under the roller 61 at this point that the control coil 12 cannot pull down the armature 25 to open control switch 61.

With the latch 50, therefore, locking the roller 61, the circuit breaker cannot at this time trip after the first reclosing operation even though a fault current may exist which would normally have energized coil 12 sufficiently to attract the armature 25 and open the switch 16. Such attraction of the armature 25 to open the switch 16 cannot occur until the end 56 of the timer arm 57 lifts the pick-up calibrating screw 54 to rotate the latch 50 to a position where the roller 61 may push it aside to permit collapse of the toggle 62—65—64 and thereby permit the attraction of the armature 25 and opening of switch 16.

The timer arm 57 completes its movement to a point where it lifts up the pick-up calibrating screw 54 after a time delay, which varies inversely with the magnitude of the short circuit current. That is, for relatively light over-load currents, the time delay may be as much as several seconds, whereas for heavy short circuit currents, the time delay may be very short, for example .25 second.

From the above, it will now be clear that the present invention provides time delay for each reclosing operation and for each opening operation following the first instantaneous opening operation.

The time delay is adjustably variable for coordination with fuses and relay controlled breakers or other reclosers any or all of which may be in series in the circuit.

Both time delays are achieved with the same timing mechanism and with individual latches.

Inasmuch as reclosing is by spring operation, a first latch 112 locks the contacts in disengaged position. The time delay after a predetermined interval releases this first latch to permit fast spring reclosure of the contacts.

Since reopening is by magnet operation, a second latch 60 locks the armature of the control magnet which in turn controls the energizing circuit of the operating magnet. The time delay after a predetermined interval releases this second latch to effect energization of the operating magnet resulting in fast magnet opening of the contacts.

Although the latter latch is on the armature of the control magnet, which is preferable because the toggle 62—65—64 permits a light latch 60 to lock against a strong pull, the net effect is to lock plunger 20 against movement. Accordingly, the latch can be located anywhere in the mechanical or electrical system which controls movement of plunger 20 including a latch on plunger 20, it being understood that relase of the latch would be controlled by the time delay mechanism.

Both the reclosing and reopening time delays are provided to automatically give the circuit time to correct the fault conditions if they can be corrected.

Under short circuit conditions, however, it becomes desirable to hasten the operation of the timer arm 57 from the point where reclosing occurs to the point where it engages the pick-up calibrating screw 54 to permit a tripping operation to occur again.

For this purpose, the additional armature 28 is an inverse time delay armature restrained by its composite spring 32 but which when attracted will operated the fork 31 to adjust the timer adjustment arm 135 for more rapid operation of the timer 92, for coordination with fuses, relay controlled breakers or other reclosers.

The shaft 29 which carries the inverse time delay armature and the adjusting fork 31 carries at its outer end the spring bracket 137 which in turn carries the four or sufficient number of leaf springs 138, 139, 140, 141 comprising the composite spring 32. These springs extend parallel to each other and in surface to surface engagement beneath the angle stop bracket 143 carrying the adjustable stops 144, 145, 146, 147.

Stop 144 is arranged so that it will only engage leaf spring 138. Thus, on relatively low current values attracting the armature 28, leaf spring 138 engaging against stop 144 will halt the armature. On higher current values leaf springs 138 and 139 engaging stops 144 and 145 will halt the armature. On still higher current values leaf springs 138, 139, and 140 engaging stops 144, 145 and 146 will halt the armature, and in so doing regulate the interval of time suitable for coordination with other devices.

On further increased current values, all the leaf springs 138 to 141 engaging the stops 144, 145, 146 and 147 will halt the armature 28. On short circuit currents, all of the springs will give to permit full attraction of the armature 28.

The stop positions after they have been set may be adjusted by making the angle bracket 143 rotatable on the pin 149 by securing to the opposite end and adjustment leaver 150 movable to three positions, 151, 152, 153, at which it may be engaged.

As the inverse time armature 28 is pulled inwardly toward the magnet 27, it rotates the adjustment fork 31 in the opposite direction as will be obvious from an inspection of Figure 1, and the curved slot 156 of adjustment fork 31 receiving the timer adjustment arm 135 will move the timer adjustment arm 135 downwardly.

The timing mechanism in housing 92 is so arranged that as the timer adjustment arm 135 is moved downwardly, the ratchets 102, 120 and timer shaft 119 may rotate more freely and when it is moved down all the way, the ratchets 102, 120 and the timer shaft 110 rotate substantially free of any time delay.

Thus, if after the contacts reclose normal current prevails, the timing arm 57 will continue to complete its movement under the time delay afforded by mechanical timer controlled ratchet 102 as determined by the full time delay available in the timing mechanism in housing 92; and on completion of its movement, the timing arm 57 will lift the pick-up calibrating screw 54 to unlock armature 25 in the manner previously described, thus making it again instantaneous on subsequent overcurrent.

If, however, an overcurrent condition still exists, the inverse time armature 28 will be attracted to an angular position as determined by the resistance offered by the composite spring 32, the said angular position being a function of the degree of overcurrent.

This attraction will result in rotation of the adjustment fork 31 so that its slot 156 will pull down the timer adjustment arm 135 also to a degree which is a function of the overcurrent condition.

The ratchet 102 and the timer shaft 110 will then rotate more rapidly under the influence of coil spring 87 of timer arm 57 to permit more rapid return of the timer arm 57 to a position where its end 56 lifts the calibrating screw 54 to unlock the control relay 12.

Under high magnitude short circuit conditions, the inverse time delay armature 28 will be attracted to its full extent and the adjustment fork 31 will be rotated to pull down the timer adjustment arm 135 to its full extent to substantially remove the time delay from the timer arm so that the timer arm may move almost instantaneosuly from the position where it has premitted reclosure to occur to a position where it lifts the pick-up calibrating screw 54, thereby unlocking the control relay armature 25 to permit it to operate once more to cause the automatic recloser to trip open.

Thus, the inverse time delay for the opening of the automatic recloser is controlled by the timing mechanism in housing 92 in that the movement of the timer arm between the position where it has permitted reclosure to occur and the position where it unlocks the relay armature 25 by lifting the calibrating screw 54 is under the control of the same time delay mechanism as controls the reclosing time delay.

As previously pointed out, however, the reclosing time delay operates through one, two, or three or more cycles to a lock-out position by depending on cumulative rotation of shaft 110 carrying ratchets 102 and 120 in the same direction.

The inverse time armature 28, adjustment fork 31 and timer adjustment arm 135 simply operate to permit more rapid movement of the timer shaft 110 in the same direction. The timer arm still operates the time delay mechanism through its full cycle for any reclosing operation, except that the last portion of the cycle after reclosing has occurred and before unlocking of the relay armature 25 may be adjusted as to time to occur more or less rapidly depending on the intensity of the overcurrent condition. Greater choice of coordination is thereby provided.

Consequently, this variation or adjustment of the time delay mechanism does not interfere with the cumulative angular rotation of timer shaft 110 which is measured to determine the number of reclosings which will occur in a single series before a lock-out is reached.

Thus, the novel automatic recloser will operate so that the first opening operation is not subject to a time delay. The first reclosing operation may or may not, depending on the adjustments, be subject to a time delay.

The adjusting fork 31 is always engaged with the timer adjustment arm 135. If the timer adjustment arm 135 is not locked in position, then the second opening operation is subject to an inverse time delay due to the action of armature 28. If the timer adjustment arm 135 is locked in position by the insertion of tip 321 of adjusting screw 320 (Figure 35) in the slot 322 of timer adjustment arm 135, the second opening operation will be at a constant time delay irrespective of the magnitude of short circuit current since the armature 28 and adjusting fork 31, Figure 1, cannot cause any movement of the timer adjustment arm.

The second and subsequent reclosing operations are subject to time delay and subsequent reopenings are subject to the same time delay which may have inverse characteristics as the second opening operation.

After the lock-out position previously described in connection with Figure 1 and illustrated schematically in Figure 27 is reached, it becomes necessary to release the parts of the automatic circuit recloser so that they may be placed in circuit once more after appropriate inspection of the line has been made.

II. *Exterior operating members*

Thus far the only parts of the automatic circuit recloser that have been described are those located within the housing and ordinarily not accessible except during major servicing or overhaul.

In Figures 2, 2a, 8, 10, and 28 to 33 the parts of the operating mechanism which are accessible from the exterior of the housing are also shown. These parts are provided particularly so that the automatic recloser may be placed in operation after the interior parts have been locked out in the position of Figure 27.

In addition, these exterior parts provide a means for making available to the serviceman information as to the number of operations of the automatic recloser and means for operating the automatic recloser to some extent independently of its primary operating mechanism.

IIa *Connection of plunger*

Figure 8:
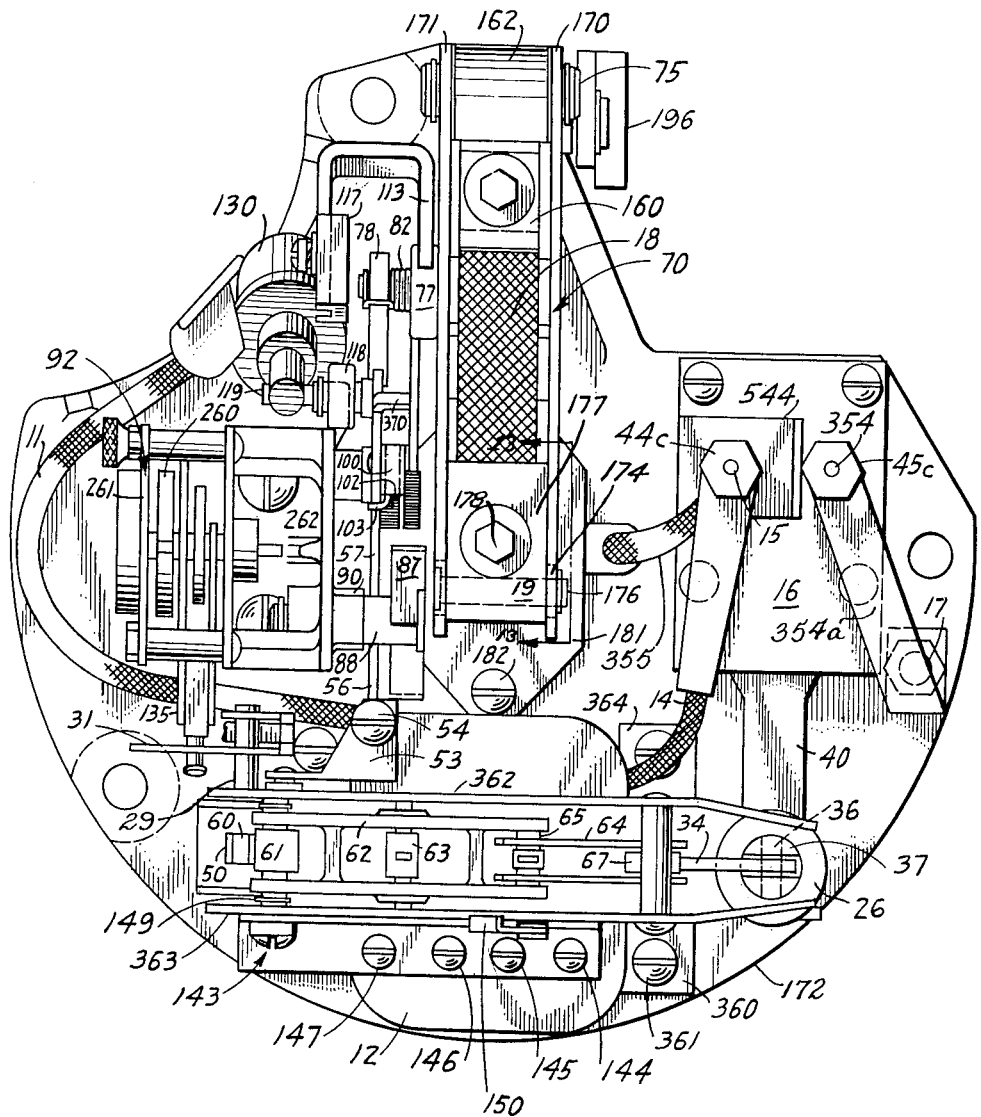
Figure 8 is a view corresponding to that of Figure 7 with the exterior operating elements of Figures 2 and 2a included.

The operating arm 70 which, as previously pointed out, is rotatably mounted on pin 75 actually consists of a pair of plates 170 and 171 (Figures 9 and 10) cross braced in any appropriate manner as by the cross braces 160 and 161 and pivotally mounted for simultaneous operation on the pin 75 carried in the vertical bracket bearing member 162 supported on the horizontal platform 172 of the upper operating apparatus chamber 173 (see also Figure 8).

The ends of plates 170 and 171 of operating arm 70 opposite the pivot 75 comprise the yoke connection 71 to the plunger 20. This yoke connection is more clearly seen in the schematic view of Figure 2, as well as in the specific views of Figures 13 and 14 and comprises a pair of parallel slots 174, 175 in the forward ends of plates 170 and 171 in which the cross pin 176 rides.

Cross pin 176 is carried by and passes through the block 177 which in turn is connected by the screw 178, Figure 9, to the upper end of plunger 20. Terminal 19 of pigtail 18 is provided with a through opening for screw 178 and is captured between block 177 and the upper end of the plunger 20. Plunger 20 passes through opening 180 in platform 172, Figure 13, and is guided for exact vertical movement through the opening 180 by bracket 181 secured to the upper surface of platform 172 by screws 182, 183, Figures 13 and 14.

Bracket 181 has an opening 184 registering with the opening 180 in platform 172. Rollers 185, 186 supported, respectively, on pins 187, 188 in bracket 181 and in recesses in platform 172 adjacent the opening 180 guide the upper end of plunger 20 providing a substantially frictionless bearing therefor.

An additional reinforcing and guide clip 190 is provided on the upper surface of bracket 181 on the side of the bracket, toward the pin 75 in order to reinforce the bracket at that point.

It will be seen that owing to the length of slots 174 and 175 as the operating arm 70 rotates upwardly about the pin 75 the plunger 20 will ride up vertically with the cross pin 176 moving to the right with respect to Figure 13 and toward the base of slots 174 and 175 owing to the rotation of arm 70 while, of course, plunger 20 moves only in a vertical line.

When the plunger 20 descends under the influence of its compression spring, hereinafter described, carrying with it the operating arm 70, then the cross pin 176 will ride to the left and toward the open end of slots 174 and 175. The operating arm 70 may be disconnected from the plunger 20 simply by removing the screw 178 which permits the block 177, as well as the terminal 19 and pigtail 18 to be removed from the plunger 20.

As seen now in Figures 2, 2a, 8, 10, and 28 to 33, the plate 170 of operating arm 70 is provided with a downwardly directed extension 192 carrying the pin 193 to which is connected the link 194. The opposite end of link 194 is connected by pin 195 to the crank 196.

In Figure 7 link 194 and crank 196 are shown hanging down in the position they will assume when the operating mechanism within chamber 173 is disconnected from the external operating parts in the exterior housing 200.

IIb. Exterior housing and lockout re-set elements

In Figures 2 and 2a, the position of link 194 and crank 196 is shown for connection to the exterior parts in the exterior housing 200. The exterior housing 200 comprises a substantially U-shaped bracket member 201 (Figure 5) set in a recess of the annular wall 202 of the operating chamber 173. Wall 203 forms a common boundary between the exterior housing 200 and the inner operating chamber 173. The exterior operating shaft 203 passes through a bearing 206 in wall 203. The end of the shaft 205 within the chamber 173 is provided with the extended key 207 registering in the key way 208 at the end of the crank 196 opposite the pin 195. A bolt 209 passing through an opening 210 in the end of crank 196 also enters a threaded opening 211 in the inner end of the exterior operating shaft 205.

Thus, the exterior operating shaft 205 is connected to the operating arm 70 in such manner that when the operating arm 70 and plunger 20 are raised, the end 195 of crank 196 will correspondingly be raised, thus rotating the shaft 205 in a clockwise direction with respect to Figures 2 and 2a and also with respect to Figures 28 to 33.

The bottom 212 (Figure 8) of the exterior housing 200 is open, and the side 213 opposite the common wall 203 is made of transparent material (see also Figures 2 and 2a). The transparent side wall 213 is secured to the bracket 201 by screws 214 (Figure 8) passing through appropriate openings 215 in the transparent side wall 213 and entering into appropriate tapped lugs carried by the bracket 201.

The outer end of shaft 205 has a section 217 to which pointer 221 is fastened. Pointer 221 is secured in any suitable manner as by the screw 222 (Figure 8) to the end of section 217 of shaft 205 and cooperates with the "closed" legend 223 and the "open" legend 224 on the transparent side wall 213 of exterior housing 200 to indicate the condition of plunger 20.

Thus, in the closed position the pointer 221 occupies the position shown in Figures 2, 2a, 8, and 31. In the open position of plunger 20, whether locked out or momentarily open before a reclosing, the pointer occupies the position shown in Figure 33 where it registers with the "open" indicia 224.

Thus, the open or lock-out position condition of pointer 221 registering with legend 224 as in Figure 33 will indicate that the automatic circuit recloser is locked open.

A counter 225 is secured in any suitable manner as by the screws 226 and spacers 227 to the interior of transparent side wall 213, the indicia face 228 being downwardly directed so that it may be visible from below. An operating lever 229 extends upwardly in the path of pin 230 carried by crank arm 231 of the exterior operating shaft 205.

As seen in Figure 28, the pin 230 moves the operating lever 229 to the right during the closed position of the automatic recloser. Each time the pin 230 moves down in response to an opening movement, a spring, not shown, in the counter 225 causes the operating lever 229 of counter 225 to move toward the left with respect to Figure 28 to the position of Figure 30, and each time the pin 230 rises once more in response to a closing movement of plunger 20, it lifts the operating lever 229, thereby adding a unit to the indicia carrying face 228 of the counter 225 and indicating the total number of times that the automatic recloser has been operated.

After the automatic recloser has been locked open in a manner previously described by operation of the lock-out ratchet 120 in cooperation with the lock-out pawl lever 121, it becomes necessary to reset the automatic recloser so that it may close after the fault which caused the locking open has been repaired.

For this purpose, a reset link 235 terminating in the ring 236 is provided, the said reset lever being rotatably mounted on the pin 237 and being secured in place by cotter pin 238. Pin 237 extends from the crank arm 240 which is an extension of cross arm 241 mounted on the sleeve 242.

Sleeve 242 is in turn rotatable mounted on section 243 of reduced diameter of the exterior operating shaft 205. Cross arm 241 of the sleeve 242 extends above the crank arm 231 and crank arm 240 of cross arm 241 extends above pin 245 which pin may be an extension of pin 230 on the opposite side of crank arm 231.

A coil spring 246 maintains the crank arm 240 and the reset link 235 in the up position even though shaft 205 is rotated so that crank 231 moves down as shown in Figure 30.

When now after a lock-out of the automatic reclosing mechanism as shown schematically in Figure 26 after the desired number of reclosures has occurred, it becomes necessary to reset the mechanism. The end of a hooked stick is inserted in ring 236 of the reset link 235 and the reset link 235 is pulled down. This pulls down the crank 240 in the cross arm 241 causing the sleeve 242 to rotate about section 243 of exterior operating shaft 205.

The crank 240 bearing on pin 245 pulls down the crank 231 rotating the shaft 205 further in a counterclockwise direction and lifting the plunger 20 and the operating arm 70 from the lockout position of Figure 26 to the lock-out release position of Figure 27. This lifts the latch roller 77 off the latching detent 112 in the principal latch 113 and up to the recessed portion 250 (see also Figure 11) of the principal latch 113.

When the recloser is released from lock-out by pulling down on ring 236, the latch roller 77 is lifted up off of latching detent 112 to the upper portion of principal latch 113. However, the principal latch 113 does not move forward during this operation since the upper section has a contour which is a radius from pivot 75 so that the latch roller merely rolls up the radius section. This construction is desirable so that the principal latch 113 will not move when the latch roller moves back down towards detent 112. This construction assures more positive latching action. When the recloser is reset from lock-out, the detent 370 strikes against the upper portion 371 of pawl 100, causing it to rotate in a clockwise direction around its pivot 101 (Figure 27), which disengages the detent 104 from the teeth of the time delay ratchet 102. The time delay ratchet 102 and lock-out ratchet 120 are then free to return to their normal reset position under the influence of reset spring 271, Figure 35. This action is possible because pawl 100 has been disengaged from time delay ratchet 102 and the teeth on lock-out ratchet 120 are so shaped that they will slip by detent 122 on lock-out pawl 121 in the reset direction.

The end 95 of the timer arm 57 is provided with the re-entrant extension 370 which in the lock-out release position shown in Figure 27 will bear against the upper end 371 of the reclosing time delay pawl lever 100 to drive the reclosing time delay pawl lever 100 away from the reclosing time delay ratchet 102 in order to permit resetting of the timing mechanism back to its original position.

The timing mechanism is now released so that it may return the timer shaft 110 carrying the reclosing time delay ratchet 102 and the lock-out ratchet 120 back to the original position of Figure 40 or 41 as the case may be.

The hooked stick inserted in the ring 236 of the reset lever 235 must be held down a sufficient length of time to permit the reset of the timing mechanism and of the timer shaft 110 to occur.

When the pull ring 236 is pulled in the downward position, it not only raises rod 20 and releases the time delay pawl 100, as described previously, but also it latches the recloser in the open position mechanically. This is accomplished by latch 251 engaging with pin 245, as shown in Figure 2a. When pull ring 236 is pulled down, the extension of pin 237 beyond the upper end of pull ring 236 engages with the upper surface of the lower leg of lock-out latch 251, see Figure 3, causing it to be rotated around its pivot 252. The detent 254 is then positioned to engage with pin 245 on arm 231 and thus hold the mechanism in the open position. The recloser is then finally released from lock-out by releasing the latch 251 by means of a switch stick pushed up against the under surface or against the extension 255.

When it is desirable to open the recloser manually and cause it to stay open, a switch stick is inserted in ring 236 and it is pulled down. The recloser is then latched open by means of latch 251 as described above. The recloser can then be reclosed by pushing up against latch 251 and unlatching detent 254 from pin 245.

It should be noted that the main difference in reclosing the recloser is that when it is latched open mechanically from the outside, it is only necessary to unlatch the recloser by pushing up on latch 251. However, when the recloser locks open electrically on the inside, the reclosing operation consists of two parts. First, the pull ring is pulled down and held for several seconds so that the timing mechanism will allow the lock-out ratchet to reset, and second, to push up on latch 251 to release the mechanical latch, which was operated during the first part of the resetting action.

III. *Specific structure of operating parts not described under headings I and II*

While in the foregoing, reference has for the most part been made to the schematic disclosures of Figures 1, 2, 2a to 2⁷ and 28 to 33, it will be seen that all of the essential operating elements of Figures 7 to 19 and 38 to 41 have been described in connection with the description of the schematic members.

Reference has at times been made to these specific figures during the description of the schematic members in order to clarify the description of the schematic members.

IIIa. *The timing mechanism*

The function of the timing mechanism in housing 92 has already been referred to. It is sufficient here to point out once more that it controls the rotation of the timer shaft 110 by the timer arm 57 in one direction to delay the return of the timer arm 57 back to its original position.

After reclosure has occurred, it returns the timer shaft 110 and its associated ratchets 102 and 120 back to their original position with a time delay period determined by the relative strength of spring 271 hereinafter described, restoring the timer shaft 110 and its associated elements back to their original position if the automatic recloser remains closed following its reclosure.

The housing 92 for the timing mechanism 260 (Figures 34 and 35) comprises essentially a pair of parallel plates 261 and 262 connected by bolts 263 and nuts 264 and spaced by spacers 265 surrounding the bolts 263 and captured between the plates 261 and 262.

The main operating shaft 270 of the time mechanism 260 rotates in appropriate bearings in plates 261, 262 extending transversely thereto.

A main spring 271 located outside of the plate 262 is connected at one end to the stationary bolt 272 carried by plate 262 and at the other end to the main operating shaft 270. A guide plate 273 carried by the main operating shaft 270 confines the turns of the main spring 271. The portion of the main operating shaft 270 extending through plate 261 carries the connecting pin 275 extending through the hexagonal member 276 mounted on the shaft 270 and through registering openings in the hexagonal member 276 and the shaft 270 so that rotation of the main operating shaft 270 will result in angular movement of the main operating pin 275 and vice versa.

Gear 280 on the main operating shaft 270 is connected to pinion 281 on the arbor 282 carried between plates 261 and 262. Gear 283 on the arbor 282 is connected to pinion 284 on arbor 285 also carried between plates 261 and 262. Gear 286 on arbor 285 is connected to pinion 287 on cam shaft 288. Cam shaft 288 is the escapement shaft of the timing mechanism. Cam shaft x288 carries at its inner end the disc 289 connected by the eccentric transverse cam pin 290 to the disc 291, which in turn is connected to the opposite end of the cam shaft 288a.

As the cam shaft 288, 288a is rotated by the gear train 280—282—283—284—286—287, the cam pin 290 describes a circle at a radius from the main axis of the cam shaft 288, 288a. The escapement lever 295 is provided at its upper end with an escapement pin 296 registering in the escapement slot 297 of the escapement wheel 298.

The escapement wheel 298 is mounted on arbor 299 which is rotatable in appropriate bearings between plates 261 and 262. The fulcrum of escapement lever 295 is the pin 300 carried by the timer adjusting arm 135. The lower end of the escapement lever 295 is provided with a flaring slot 305 wider toward its lower end at 306 and narrow at 307 at its upper end, the axis of the slot 305 extending along a line through the fulcrum 300 and the escapement pin 296.

Slot 305 surrounds the cam pin 290. As the main operating shaft 270 of the timer is rotating in one direction, it winds up the main spring 271. At the same time, through the gear train 280, 281, 283, 284, 286, 287, it rotates the sam shaft 288 and the cam pin 290. With the cam pin 290 resting in the narrow portion 307 of the flaring slot 305, the escapement lever 295 is rotated back and forth around the fulcrum 300.

The escapement pin 296 of the escapement lever 295 entering the escapement slot 297 of the escapement wheel 298 causes the escapement wheel 298 to oscillate back and forth.

The time delay thus obtained is a function of the inertia of the escapement wheel 298 and the escapement lever 295 which, owing to the eccentric movement of the cam pin 290, must move in one direction, come to rest, move in an opposite direction, come to rest once more, and repeat this operation continuously as the main operating shaft 270 of the timing mechanism is rotated.

The inertia of these elements thus provides the time delay. Similarly, when the exterior rotative force on the main operating shaft 270 of the timing mechanism is released, the main spring 271 rotates the elements in an opposite direction to reset the operating shaft 270 back to its original position, being delayed, however, by the escapement lever 295 and the escapement wheel 298, the inertia of which owing to constant change of direction of movement must be overcome at each change of direction of movement.

It will be obvious that the longer the period of each oscillation of escapement lever 295 and escapement wheel 298, the greater the time delay and the shorter the period of oscillation, the smaller the time delay.

For this purpose, the fulcrum 300 is made shiftable vertically. With the fulcrum 300 in the lower position as shown in Figures 34 and 35, full time delay is achieved.

As the fulcrum 300 is raised, the flared portion 306 of the slot 305 moves into registry with the cam pin 290 so that the cam pin 290 oscillates the lever 295 only at the right and left extreme position, its rotation thereby oscillating it through a shorter period. This period decreases as the flared portion 306 of the slot 350 which registers with the cam pin 290 is widened by raising of the fulcrum 300 of the escapement lever 295.

In addition to the decreased period of oscillation, the power ratio of escapement pin 296 with respect to escapement wheel 298 is increased since as the fulcrum 300 of the escapement lever 295 is raised, the escapement pin 296 rises in slot 297 of the escapement wheel to an increased distance away from the pivot 299 of the escapement wheel.

Consequently, the net inertia of the escapement wheel 298 is decreased or rather the net effect of inertia owing to the increase in the power ration above referred to is decreased.

When fulcrum 300 is raised to a point where the full flared portion 306 of the flaring slot 305 registers with the cam pin 290, the cam pin 290 does not engage the escapement lever at all during its rotation and operating shaft 270 may rotate even in response to external force or in response to its spring 271 free of the time delay effected by the escape-lever 295 and escapement wheel 298.

To accomplish the shift in fulcrum 300 which varies the time delay afforded by the timing mechanism 260, the timer adjustment arm 135 which carries the fulcrum 300 is pivotally mounted on the cross pin 310 carried between plates 261 and 262. A coil spring 311 biases the end of the timer adjustment arm which carries the fulcrum 300 downwardly. The outer end of timer adjustment arm 135 has the reduced diameter section 312 which receives the slot 156 of the timer adjustment fork 31.

As the timer adjustment fork 31 operates in response to rotation of armature 28 in a manner previously described to move the end 312 of the timer adjustment arm 135 down, the fulcrum 300 of the escapement lever 295 is raised to decrease the time delay afforded by the timing mechanism 260.

If timer adjustment fork 31 is not rotated to pull down the timer adjustment arm 135, then the condition shown in Figures 34 and 35 prevails, in which full time delay is achieved.

An adjustable stop member 315 riding in slot 316 is provided against which the inner end 317 may rest to predetermine the maximum time delay. The higher the adjustable stop 315 is raised, the shorter the maximum time delay period and therefore the faster the reclosing operation.

The adjustable stop rides on the inside plate 262, being guided in slot 316, and a clamping screw 320 extending through the slot 316 into the adjustable stop 315 is provided, the said clamping screw having a wider portion which may engage the portion of the exterior surface of the plate 262 defining the slot 316, the material defining the slot 316 being thus captured between the stop 315 and the clamping screw 320. The clamping screw 320 has an extension 321 passing to the left of the adjustable stop 315 with respect to Figure 35 on which the end 317 of the timer adjustment arm 135 rests.

Thus, the stop 315 and particularly extension 321 of clamping screw 320 determine the maximum time delay of the timing mechanism 260, while fork arm 31 on operating arm 135 in response to the attraction of armature 28 determines the variations from this maximum time delay in the manner previously described.

The screw 320 is readily accessible in order to raise and lower the stop 315 and the extension 321 to adjust the maximum time delay. If, for any reason, it should be desired that no variation in the time delay should occur, irrespective of the degree of energization or attraction of armature 28, then extension 321 of clamping screw 320 may be anchored into slot 322 at the end 317 of timer adjustment arm 135.

This will prevent movement of the timer adjustment arm 135 and of the fulcrum 300 away from its adjusted position.

By this means, therefore, a simplified timing mechanism is provided which will time delay the rotation of operating shaft 270 in one direction by an exterior force and which will correspondingly time delay the return of operating shaft 270 to its original position under the influence of the main spring 271.

IIIb. Connection between timing mechanism and the operating apparatus

As previously described in connection with the schematic view of Figures 1, 20 to 27 and 38 to 41, the timing mechanism controls the rotation of the timer shaft 110 which carries the reclosing time delay ratchet 102 and the lock-out ratchet 120.

The connecting pin 275 carried by the main operating shaft 270 of the timing mechanism, as shown in Figures 36 and 37, engages the fork 325 in the crank arm 326 carried by the timer shaft 110. The timer shaft 110, as previously described, carries the reclosing time delay ratchet 102, being connected thereto in any suitable manner.

The lock-out ratchet 120 is provided with a plurality of openings 327 and securing screws 328. The reclosing time delay ratchet is provided with a pair of eccentric openings 329. The lock-out ratchet 120 is carried by the reclosing time delay ratchet 102, the angular position of the lock-out ratchet 120 being shiftable with respect to the reclosing time delay ratchet 102 and the timer shaft 110 in order to predetermine the number of reclosures before a lock-out may occur.

This shift of the lock-out ratchet 120 is obtained by lining up appropriate openings 327 in the lock-out ratchet 120 with the openings 329 in the reclosing time delay ratchet 102 and interconnecting the ratchet 120 and 102 by screws 328 and appropriate bolts.

As previously pointed out, whether or not the time delay on first reclosure will be obtained is determined by the initial angular position of the reclosing time delay ratchet 102 as shown in Figures 38 and 39.

For this purpose, gear 280 on main operating shaft 270 of the timer is provided with a pin 329 and the wall 262 of the timing mechanism carries the latch 330 pivotally mounted on the lower right-hand bolt 263 with respect to Figure 34. Latch 330 carries the clamping screw 331 passing through the slot 332 in wall 262. The latch member 330 may be adjusted either to the position of Figure 38 or to the position of Figure 39.

When it is adjusted so that pin 329 rests in the detent 333, then the angular position of the main operating shaft 270 and the timer shaft 110 is adjusted so that the first reclosure is time delayed.

When it is adjusted so that pin 329 rests against the end 334 of latch 330, then the angular position of the main operating shaft 270, timer shaft 110 and the reclosing time delay latch 102 is adjusted so that the first reclosure is instantaneous.

After the first full reclosure occurs, the engagement of pawl tooth 104 against teeth 107a will provide the short time delay between the reclosing of the contacts of the automatic recloser (disengagement of latch roller 77 from latch 113) and the full resetting of the timer arm 57 which permits reopening to occur.

As shown in Figures 40 and 41, the angular position of teeth 127 of the lock-out ratchet 120 determines the number of reclosures after which a lock-out will occur. Where the lock-out ratchet 120 is secured to the ratchet 102 so that the teeth 127 are closer to the pawl tooth 122 then the lock-out will occur after relatively fewer reclosures.

When the teeth 127 are adjusted so that they are relatively further from pawl tooth 122, then lock-out will occur after a relatively large number of reclosures.

The setting of Figure 40 shows the position of the lock-out ratchet 120 for a lock-out after two reclosures and the setting of Figure 41 shows the position of lock-out ratchet 120 for a lock-out after three reclosures.

If no lock-out at all is desired, then the lock-out ratchet 120 need merely be removed by removal of screws 328.

IV. The housing of the automatic reclosure

The operating mechanism has already been described in connection with the schematic views of Figures 1, 2 and 20 to 33. In the course of the description in connection with these schematic views, Figures 7 to 19 have from time to time been referred to for more specific showing.

Figure 5:
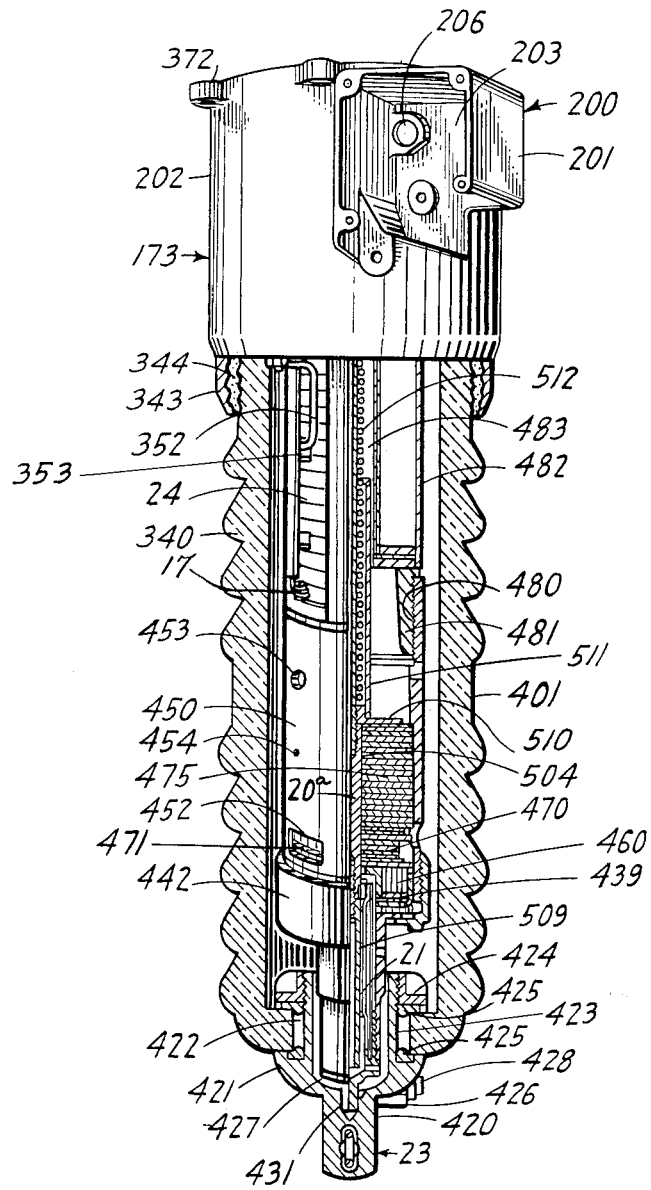
Figure 5 is a view in perspective partly in vertical cross-section showing the placement of the various elements of the movable contact plunger, stationary main contact, interrupting chamber and operating coil located below the operating elements shown schematically in Figure 1 and in side elevation in Figures 7 and 8.

Consequently, the specific operating mechanism has already been described. It is, therefore, sufficient here to point out that the automatic recloser mechanism comprises essentially two chambers, an upper operating chamber 173 (Figure 8) defined by the annular wall 202 and the bottom platform 172 and a lower chamber 340 comprising a porcelain housing, the upper wall of which is the platform 172 and the lower end of which contains the lower terminal 23 (Figure 5).

IVa. The upper chamber and support of operating apparatus in the upper chamber of the housing The upper annular wall 202 defining the upper chamber 173 is preferably a casting of any suitable material having the lower horizontal flange 341 which seats on the annular insulating plate 342, which in turn seats on the top of porcelain housing 340. An annular skirt 343 extends below the flange 341, the said annular skirt 343 having an internal diameter greater than the exterior diameter of the top end of the porcelain housing 340 providing a recess into which an appropriate weatherproof cement 344 may be poured to integrate the top housing wall 202 with the bottom wall 340.

Platform 172 is supported within the upper housing 173 in any suitable manner as by appropriate bolts (Figure 10). Platform 172 is spaced substantially above flange 341 and plate 342, on lugs standing up from flange 341.

Terminal 10 seen more specifically in Figure 10, comprises a contact carry stud inserted with appropriate insulating bushing 350 in annular wall 202 of housing 173. A pigtail 11 (Figures 9 and 10) extend from the inner end of terminal 10 to terminal 341 of the control coil 12. The current after passing through control coil 12 passes through terminal 13 of control coil 12 (Figure 1) to pigtail 14 (Figures 1 and 9) and then to terminal 15 of the control switch 16, pigtail 355 (Figures 1, 9) then leads from terminal 15 of the control switch 16 to terminal 17 of the operating coil 24.

Terminal 15 is connected to contact 45 of the control switch 16. Contact element control switch 16 is connected to stud 354. Stud 354 is connected by strap 354A to metal platform 172. Metal platform 172 is connected to pigtail 18 to terminal 19 on the plunger 20. Metal platform 172 is also connected to operating coil 24, terminal 353, by pigtail 352.

The control coil, its armatures and toggles are shown in Figures 15 to 19 and have already been specifically described. The only additional elements shown in Figures 15 to 19 and 9 are the securement lugs 360 and screws 361 for securing the laminations 27 to the platform 172 and the upper frame members 362, 363 carried by the upper platform 364 of the control unit, which in turn supports the pins 63 and 35 and which provide a support for shaft 29 of armature 28 and the stop bracket 143.

The latch mechanism shown in Figures 11 to 14 has been specifically described in connection with Figures 1 and 20 to 27. The only additional element required to be pointed out is that pin 114 which supports the principal latch 113 is carried by lug 365 on platform 172 as is also the pin 131 which supports the lower end of dashpot 130.

The timing mechanism 260 in housing 92 is provided with flanges 366 at the lower ends of plates 261 and 262 which are secured by screws 367 and appropriate spring washers in the top platform 172.

The upper rim of the annular side wall 202 of the upper chamber 173 (Figures 8 and 10) is provided with the outwardly extending lugs 372 and the lid or cover 373 is provided with matching lugs 374. The under side of the lid 373 is provided with the annular recess 375 which rests on and receives the top edge of the annular wall 202 with an appropriate gasket or other sealing means 376 provided between the meeting surfaces.

The lugs 374 and 372 which register with each other are interconnected by appropriate bolts 377, nuts 378, and spring washers 379 to produce an effective seal and to securely affix the cover 373 to the upper chamber in such manner that the ring 380 in the top of the cover may be used as a hoisting ring for lifting the entire automatic recloser into the desired position.

The center of the interior of the cover has an inwardly directed projection 381 having an annular recess 382 supporting the plate 384. Plate 384 is relatively loosely mounted in recess 382 of projection 381 and is supported and braced by the annular ribs 385, 386. Plate 384 acts as a gasket to ensure a tight fit between cast ribs 620—621 and plate 600.

IVb. The lower contact positioning chamber

The lower chamber defined by the porcelain housing 340 is filled with oil, the oil level being maintained at a point where it flows over the upper platform 172 and up to approximately the middle horizontal level of the upper chamber 173. An oil gauge 390 comprising a hollow transparent tube is connected by the fitting 391 to the interior of chamber 173, the oil gauge 390 being contained in exterior housing 200 and being visible through the transparent side 213 of exterior housing 200. The desired level of oil is indicated by the mark 392 on the oil gauge 390.

The lower terminal member 23, as seen in Figure 5, is a conductive metallic member having an extension 420 below the porcelain housing 340 and an annular flange 421 engaging the bottom of the open lower end 422 of housing 340. Terminal 23 also has an inner extension 423 threaded at its inner end. A securing nut 424 is threaded on the threaded end of extension 423 clamping the material defining the opening 422 between the nut 424 and the flange 421.

Gaskets 425, 425 may be inserted to seal the lower end. A transverse tube 426 may be inserted in extension 420 communicating with the recess 427 in inner extension 423 of the terminal to serve as an oil drain, an appropriate plug 428 being provided.

IVc. Support members for the lower housing

The automatic recloser is supported preferably in an overhead position on an appropriate supporting pole (Figure 4) by a U-shaped clamping strap 400 which embraces the central horizontal annular supporting recess 401 of the lower porcelain housing. The U-shaped clamping strap 400 has a base section or bracket 402 and extending legs 403 which may be intersected by the quater circle cross straps 404.

Preferably, the legs 403 extend to a point on the recess 401 180° from each other and two of the cross straps 404 extending over 90° of recess 401 are provided, the meeting end of the two cross straps being connected by the bolt and nut assembly 405 and the outer ends of the cross straps 404 being connected to legs 403 by the bolt and nut assembly 406. The base 402 may have, if desired, an appropriate extension entering into the recess 401 although it is not essential since the cross straps 404 held in recess 401 serve to support the automatic circuit recloser. Securing bracket passes across the top of both cross arms 410, 414 and has a downwardly extending section 402a in front of cross arm 410. The lower clamping bracket 408 passes beneath cross arms 410, 414; bracket 408 has for this purpose extension 413 under cross arm 414. The brackets 402 and 408 are duplicated on each side of pole 411. Brackets 402 and 408 are connected by securing bolts passing through alined openings therein between cross arms 410 and 414.

Extensions 413 of re-entrant legs 408 bearing on the under side of the additional cross arm 414 serve to prevent accidental tilting of the base 400 or of the cross arm 410 owing to the weight of the automatic circuit recloser and especially in response to any force exerted on ring 236 during the resetting of the automatic recloser structure to closed circuit position following a lock-out.

V. *The main stationary and movable contacts and the arcing chamber*

The main contacts including the plunger 20 and the stationary contact 21, as well as the operating coil and the reclosing spring, the arcing chamber and the blow-out structure may most readily be seen in Figure 5 and the exploded composite view of Figure 6.

Stationary contact member 22 having the leaf spring contacts 21 defining a tube at its upper end and having the lower extension 430 is secured to the terminal 23 by seating the base of stationary contact 22 in the recess 427 and forcing the extension 430 into the auxiliary lower recess 431 communicating with recess 427. Metal tube 434 is internally threaded at 435 at its lower end to engage threads 436 on the lower contact 22 in order to interengage these elements; it seats in recess 427 of terminal 23 and serves as a receptacle for contact fingers 21. The inner diameter of tube 434 is constant throughout its length.

Metal tube 434 has a reinforcing flange 439. The inner opening 440 of metal tube 434, as above described, is only sufficiently wider than the ends 441 of contact fingers 21 to permit them to be spread by plunger 20a when it enters between the fingers.

The metal nut 442 is provided with the internal thread 443 and the relatively small diameter opening 444. Opening 444 in nut 442 is just wide enough to receive the reinforcing portion 438 of tube 434 but is sufficiently small so that the base of the nut seats against the lower surface of flange 439.

The arc chamber housing 450, of insulating material, is externally threaded at 451 to engage the threads 443 of the nut 442. The arc chamber housing tube 450 is provided with appropriate vents 452, 452, and 453, 453, as well as the smaller vent 454 to permit escape of arc gases and the displacement of arc gases by oil in the housing 340.

Vents 455 are also provided in the reinforced portion 438 of the lower tube 434 for the same purpose. A magnetic blow-out coil 468 is provided resting on the upper surface of flange 439 and connected thereto by blow out coil terminal 462 and screw 463 and having a central opening 461 registering with opening 440 in tube 434.

The inner end of coil 460 terminates at opening 461 in an inner stationary arcing contact 465 so that when the automatic recloser contacts are separated, current flows through coil 460 generating a radial magnetic field which will spin the arc.

The arc extinguishing plates located within the arc chamber housing 450 and above the coil 460 comprise alternate circular insulating plates 470, 470 aligned to form a tube of great strength, and alternate rectilinear insulating plates 471, 471 also of insulating material.

Certain of the plates, such as plates 470, may be provided with spacers 472 relatively very thin in cross-section to provide spaces for the escape of ionized gases from the arc chamber and for the introduction of oil in place thereof.

The alternation of plates 470 and 471 permits oil to enter into the arc passage to replace the ionized gases. The plates 470 and 471 of registering openings 473, 473 which are aligned with each other and with opening 461 of the blow-out coil 460 and opening 440 of tube 434 to produce an arc passage.

Above the arc extinguishing plates 470 and 471 additional fibre or other insulating plates 475 may be placed in order to continue the arc passage to the top of the arc chute housing 450, the arc passage being defined by aligned openings 476 in plates 475.

Thus, it will be seen that the arc passage is essentially a small diameter tubular member consisting of the interior longitudinal opening 440 in tube 434, opening 461 in blow-out coil 460, aligned openings 473 of plates 470 and 471 and aligned openings 476 of plates 475.

All of these openings are of the same diameter to produce in effect a tubular inner arc chamber. The plunger 20 is of just sufficient diameter to be able to move within the arc chamber formed by these aligned openings without binding leaving the smallest possible clearance consistent with movement without any binding force.

The upper end of arc chute housing 450 is internally threaded at 480 to receive the circular spacer 481 which is externally threaded. The housing 482 for the operating coil 24 seats on the spacer 481, the said housing having an interior tubular opening 483 aligned with the arcing tube within which the plunger 20 operates.

Plunger 20 comprises a conductive member 500 secured at its upper end to the block 177 in the manner previously described so that as it moves up or down, the operating arm 70 will be moved up and down.

The conductive member 500 moves in aligned openings in member 181 and in the spring bearing 501 secured to the under side of platform 172 in registry with the opening in the platform 172, previously referred to, which in turn is aligned with the arcing tube.

The lower end of conductive member 500 is threaded at 502 to engage in the tapped opening 503 in the contact member 504 having the arcing contact section 505 and the stationary contact section 506. The lower end of contact member 504 receives the screw 507 which is received in the tapped opening 508 of the corn cob 509 or fiber followers.

The corn cob 509 or fiber follower is the same diameter as the contact member 504.

Corn cob 509 is hollow and open at the bottom. Pin hole 515 communicates between the hollow interior and the exterior of corn cob 509 to relieve either excess pressure or a partial reduction of pressure during the movement of the plunger 20 and thereby to permit the oil always to fill the hollow interior of the corn cob 509.

The collar 510 is also threaded on the threaded end 502 of the conductive member 500, the said collar being preferably of iron and having welded thereto the iron sleeve 511. The upper surface of the collar furnishes a seat for the spring 512 captured between spring bearing 501 and collar 510. The iron sleeve 511 surrounds the spring. When coil 24 in housing 482 is energized, the iron sleeve 511 and collar 510 act as the armature and are drawn up into the tubular opening 483 since they are secured to conductive member 500, which in turn is secured to contact 504 and corn cob 509, these elements are simultaneously drawn up.

When coil 24 is de-energized, spring 512 drives the contact plunger 20 consisting of conductive member 500, contact 504, corn cob 509, and armature 511 down.

In the normal position of the automatic recloser, the lower end of corn cob 509 is at the lower end of tubular member 434 in approximately the region of threads 436 of the stationary contact member 22, and the main contact 506 of contact member 504 registers with and is in engagement with finger tips 441 of the stationary contact fingers 21.

As the plunger is drawn up, an arc is drawn between the stationary arcing contact 465 and the movable arcing contact 505 energizing the circular magnetic field 460 to spin the arc.

The arc is compressed in the passage formed by aligned openings 461, 473, and 476. The passage is maintained as a relatively small cross-section annular passage by the corn cob 509 which is drawn up into the arc chamber. The main contact member 504 and corn cob 509 are of the same diameter. The outer diameter of these elements is substantially the same as the inner diameter of aligned openings 440, 461, 473, and 476, being only sufficiently smaller to permit relative movement.

The arc is thus squeezed in the annular space, being maintained by the corn cob 509 and arc gases are vented through openings 452, 453, and 454, as well as through the channels created by spacers 472.

The arc is, therefore, rapidly extinguished and the ionized gases replaced by oil which flows in turbulently.

When coil 24 is de-energized, spring 512 drives the plunger 20 down once more to close the circuit breaker.

By this means, therefore, an arcing chamber is produced which under short circuit conditions will serve to extinguish the arc which is drawn in ½ cycles.

VI. *The control switch*

The control switch 16 is shown in top view in Figure 9 and in side elevation in Figure 7, as well as in the schematic view of Figure 1. The control switch is also shown in the exploded view of Figure 42.

The control switch has an insulated housing 520 consisting of a block of insulating material, preferably of compressed horn fiber, the said block having a simple cylindrical opening 521 to receive the operating portions of the control switch, the said opening communicating at its lower end with the lateral passage 522.

The opposite sides of the insulating block 520 are provided with lateral openings 523, 523 communicating with the interior cylindrical opening 521 providing means for the access of oil to the interior.

Passage 522 has at its outer end openings 524 which provide a bearing for the pivot pin 41 of the switch operating lever 40, the said pin passing through opening 525 in the switch operating lever 40. The inner end 43 of the switch operating lever 40 is provided with a transverse opening 526 through which pin 527 passes.

The contact carrying block 528 of insulating material is provided with a lower channel 529 fitting over the end 43 of the switch operating lever 40. Transverse openings 530 in block 528 receive the pin 527 which passes through opening 526 in the switch operating lever 40 and thereby hingedly connect the block 528 to the switch operating arm 40.

The upper end of the contact block 528 has a U-shaped bracket 531 secured thereto in any suitable manner as by the screws 532. The legs of the bracket 531 are provided with openings 533 which receive the pin 534 which is fixed in the legs of the bracket 531 in any suitable manner.

The pin 534 passes through the transverse horizontal opening 535 in insulating barrier block 536, thereby pivotally securing the block 536 to bracket 531.

Contact block 537 is a substantially U-shaped member of current carrying material having the contact face 44a and the contact face 44b. The contact block 537 which is actually a contact bridging member also has a central cylindrical extension 538 with transverse hole 539 therein, the said extension 538 being insertable from the under side into the vertical opening 540 in block 536.

Pin 534 which secures block 536 to bracket 531 and contact carrying block 538 also secures the bridging contact 537 to the barrier block 536.

Thus, as the lever 40 is rotated in a vertical plane about its pivot pin 41, the insulating contact carrying block 528 and the contact bridging block 537 are moved up and down together with the barrier insulating block 536 between them. Since the barrier block 536 has limited rotation with respect to its mounting, the bridging contact 537 has similar limited rotation and may adjust itself to unevenness in the contacts 44 and 45 which contact block 537 bridges.

The main insulating block 520 is provided with vertical openings 541 to assist in securing the block 520 to the platform 172. An insulating cover 542 is provided with openings registering with the openings 541 in the block. Bolts 543 passing through the cover and through openings 541 secured the cover 542 to the block 520 and also provide a securement means for securing the main insulating block 520 of the switch 16 to the platform 172.

The cover carries the contact studs 45 and 44 which have threaded extensions 354 and 15 on which the nuts 45c, 44c are placed to secure the contact blocks 44 and 45 in position where they may be engaged by the bridging contact 537.

An insulating barrier 544 consisting of an angular member of insulating material is secured between the nut 44c and cover 542. Connections may, of course, be made to the terminals 15 and 354 as previously described.

Pigtail 14 may be connected to terminal 15 and the current carrying strap 355 may be connected to terminal 17, the said insulated strap being connected by nut and appropriate washers through the platform 172 to the bolt forming terminal 17 as previously described.

It will thus be seen that as the switch 16 is operated to closed position, the insulating barrier block 536 extends between the stationary contact blocks 44 and 45 while the bridging block 537 operated by lever 40 interconnects the stationary contact blocks 44 and 45.

When the bridging contact block 537 is pulled away from the stationary contact blocks 44 and 45, any arcing or flash-over at this time is prevented by reason of the fact that the insulating barrier 536 remains for a time in position between contact blocks 44 and 45.

As soon as the bridging block 537 separates from contacts 44 and 45, the full line current passes through the operating coil 24 so that the circuit breaker is opened as previously described.

By this means, therefore, a simplified control switch is provided, the said switch being adapted to carry substantially the full normal current rating in order to by-pass the operating coil 24.

The switch 16 is not, however, required to interrupt a fault current since it is in shunt with the operating coil, thereby preventing or limiting almost entirely any arc which might be formed on separation of the bridging contact 537 from the stationary contacts 44 and 45. The plunger contacts within the lower chamber then interrupt the fault current.

VII. *Housing cover*

During a heavy current interruption, the oil, air, and gas and the arc products are blasted up against the inside of the cover 373.

If a single exit port alone were provided, the expansive action of the arc and the vaporized oil would blast out a considerable quantity of oil on heavy current interruption.

Since the recloser contains only a relatively small amount of oil, it is desirable that as little as possible be dissipated on each opening so that a long series of operations can occur without danger of failure.

For this reason, the lid 373 is so constructed that a tortuous path is provided for the exit of oil and gases which may be blased against the lid, the tortuous path being so arranged that the direction of the gas and oil is reversed many times as it proceeds to the exit and the heavier particles of oil are thrown off against the walls of the lid and flow back.

As seen in Figures 8 and 43, the central member 381 of the lid has secured thereto by the lug or rivet 382 the pair of plates 384, 600. Plate 384 has a substantially large central opening 601. The lower plate 600 has a central opening 602 to admit the lug or rivet 382 and a plurality of small openings 604 surrounding the opening 602.

The shoulder 605 on the central member 381 of the cover serves to space the washer 606 and baffle 607 from the openings 604 so that a small passage 610 is provided leading to the openings 604 from the interior of the housing.

A cylindrical baffle 612 is provided surrounding the openings 604. When oil and gases are blasted up by the extinguishment of the arc, they must initially follow a somewhat tortuous path in order to escape upwardly through openings 604.

The baffle plate 607 and the annular baffle 612 serve to exclude most of the oil droplets permitting to a great extent only the gases or vapors to escape through openings 604. Such gases or vapors as escape through openings 604 enter into the chamber 615 defined by annular ring 386.

The only exit from chamber 615 is either back through the holes 604 or through the tortuous path defined by the oppositely directed ribs 620, 621 in the interior of the lid.

The ribs 621 are connected to the annular ring 386, while the ribs 620 are connected to the outer annular ring 385.

The gases first pass guided by the rib 630 into passage 631 where a great deal of their energy is absorbed by the baffles 632, 633. Then the gases pass clockwise with respect to Figure 43, being guided by the successive baffles 621, 620 in an extremely tortuous path until they reach the opening 640 which is displaced almost 360° from the point of entry of the gases into the tortuous path.

The exit 640 is a tube or passage cast in the cover itself passing through the rim of the cover on that side and having a downwardly directed exit 641 in the lug extension 642 of the cover. The downwardly directed opening may be protected by screen 643.

As seen in Figures 8 and 43, a pair of opposite openings 650, 650 are provided in the combined plates 384—600. These openings provide a passage through which the oil trapped in the tortuous exhaust passage may leak back into the housing.

The openings 650 are provided with flapper valves 652 held in the openings 650 by the cotter pin 653 and so arranged that an upwardly directed blast will drive the valves into closing engagement with the holes 650, but when pressure is released the valves 652 will open once more to permit oil trapped in the tortuous passage to leak out.

In the foregoing I have described my invention solely in connection with specific illustrative embodiments thereof. Since many variations and modifications of my invention will now be obvious to those skilled in the art, I prefer to be bound not by the specific disclosures herein contained but only by the appended claims.

I claim:

1. In a circuit breaker for protecting electric currents, a pair of cooperable contacts, an electromagnet responsive to fault currents in the circuit to be protected by said circuit breaker, means for operating said contacts into engagement and disengagement with each other, an armature for said circuit breaker having a non-operated and a plurality of operated positions, said armature being susbtantially operable to one of said operated positions in accordance with the energization of said electromagnet by said fault currents and mechanism controlled in accordance with the operation of said armature to one of said operated positions for controlling the time of operation of said contacts.

2. In a circuit breaker for protecting electric circuits a pair of cooperable contacts, an electromagnet responsive to fault currents in the circuit to be protected by said circuit breaker, means for operating said contacts into engagement and disengagement with each other, an armature for said circuit breaker having a non-operated and a plurality of operated positions, a plurality of leaf springs, each spring being individually positioned and forming individual stops for the operated positions of said armature, said armature being substantially operable to one of said operated positions in accordance with the energization of said electromagnet by said fault currents and mechanism controlled in accordance with the operation of said armature to one of said operated positions for controlling the time of operation of said contacts.

3. Switch gear having a housing; oil in the housing; an oil retaining cover for said housing; said cover having a passage for venting gases from said housing; said passage comprising a plurality of baffles for intercepting oil; said passage being defined on its upper side by the body of said cover and on its lower side by a plate spaced from the main body of said cover; an entry to said passage comprising an opening substantially centrally located in said plate; and an annular baffle between said cover and said plate substantially surrounding said opening and defining a central area; a lateral opening from said central area to the remainder of the passage; and an exit from the passage.

4. Switch gear having a housing; oil in the housing; an oil retaining cover for said housing; said cover having a passage for venting gases from said housing; said passage comprising a plurality of baffles for intercepting oil; said passage being defined on its upper side by the body of said cover and on its lower side by a plate spaced from the main body of said cover; an entry to said passage comprising an opening substantially centrally located in said plate; and a horizontal baffle plate spaced beneath said opening; and an annular baffle plate extending below said first-mentioned plate and spaced from said horizontal baffle plate.

5. Switch gear having a housing; oil in the housing; an oil retaining cover for said housing; said cover having a passage for venting gases from said housing; said passage comprising a plurality of baffles for intercepting oil; said passage being defined on its upper side by the body of said cover and on its lower side by a plate spaced from the main body of said cover; an entry to said passage comprising an opening substantially centrally located in said plate; and an annular baffle between said cover and said plate substantially surrounding said opening and defining a central area; a lateral opening from said central area to the remainder of the passage; and an exit from the passage; and a plurality of valve controlled openings in said plate spaced radially beyond said baffle plate.

References Cited in the file of this patent

UNITED STATES PATENTS

| | | |
|---|---|---|
| 1,161,716 | Merriam | Nov. 23, 1915 |
| 1,180,805 | Troger | Apr. 25, 1916 |
| 1,631,681 | Hilliard | June 7, 1927 |
| 1,737,648 | Edsall | Dec. 3, 1929 |
| 1,845,463 | West | Feb. 16, 1932 |
| 1,846,841 | Burnham | Feb. 23, 1932 |
| 2,118,355 | Matthews | May 24, 1938 |
| 2,239,224 | Goldner | Apr. 22, 1941 |
| 2,300,250 | Fisher | Oct. 27, 1942 |
| 2,316,470 | Triplett | Apr. 13, 1943 |
| 2,331,778 | Hill | Oct. 12, 1943 |
| 2,485,094 | Gundersen | Oct. 18, 1949 |